United States Patent [19]
Bryant et al.

[11] Patent Number: 5,764,546
[45] Date of Patent: Jun. 9, 1998

[54] DAQ CONFIGURATION SYSTEM AND METHOD FOR CONFIGURING CHANNELS IN A DATA ACQUISITION DEVICE

[75] Inventors: Deborah E. Bryant; Audrey F. Harvey, both of Austin, Tex.

[73] Assignee: National Instruments Corporation, Austin, Tex.

[21] Appl. No.: 756,401

[22] Filed: Nov. 27, 1996

[51] Int. Cl.$^6$ ............................................. G05B 19/02
[52] U.S. Cl. ........................ 364/580; 345/348; 345/965; 345/967; 345/970
[58] Field of Search ............................. 364/580, 550, 364/551.01, 570, 146; 395/500, 701, 702, 326, 339, 651, 965, 966, 967, 970; 345/326, 339, 348, 349, 465, 966, 967, 970

[56] References Cited

U.S. PATENT DOCUMENTS

| | | | |
|---|---|---|---|
| 4,812,996 | 3/1989 | Stubbs | 364/487 |
| 4,914,568 | 4/1990 | Kodosky et al. | 364/200 |
| 5,155,836 | 10/1992 | Jordan et al. | 395/500 |
| 5,301,336 | 4/1994 | Kodosky et al. | 395/800 |
| 5,386,360 | 1/1995 | Wilson et al. | 364/146 |
| 5,400,246 | 3/1995 | Wilson et al. | 364/146 |
| 5,475,851 | 12/1995 | Kokosky et al. | 395/800 |

OTHER PUBLICATIONS iotech, "IEEE 488 & Data Acquisition Catalog", pp. 88–91, Apr. 17, 1995.
National Instruments, "Instrumentation Reference and Catalogue", pp. 2–98 to 2–101, 3–12 to 3–13, 1995.

*Primary Examiner*—Emanuel Todd Voeltz
*Assistant Examiner*—Patrick Assouad
*Attorney, Agent, or Firm*—Conley, Rose & Tayon; Jeffrey C. Hood

[57] ABSTRACT

A data acquisition configuration system and method for facilitating the creation of data acquisition applications. The present invention enables the user to create channel configurations which include information for a respective DAQ hardware channel, such as the physical phenomena being measured and how the phenomena is being measured. The user then assigns a name to each respective channel configuration. This channel configuration name is then usable in a data acquisition application to specify the channel configuration, thus simplifying application development. After specifying a channel configuration and assigning a name, the user then constructs a program which controls the data acquisition system. The program construction includes providing the assigned name which specifies the channel configuration for the selected channel of the data acquisition device. The program can then be executed to perform a data acquisition operation, wherein the executing includes using the channel configuration referenced by the assigned name in performing the data acquisition operation. The user is thus not required to create code to specify the channel configuration. Further, the program can execute in units of the physical quantity being measured/generated according to the channel configuration, and the user is not required to create code to operate in the units of the physical quantity being measured/generated.

63 Claims, 43 Drawing Sheets data in temperature units 82.250 cjc channel info

CJC Dev
2

CJC Channel
|ob0!sc1!md1!cjtemp cjc input limits
high limit
0.00
low limit
1.00 built-in CJC Type
SCXI Thermistor

CJC Temp/lex
0.0001 device
2 channel string
|ob0!sc1!md1!3 input config
coupling (no change:0)
no change
input config (no change:0)
differential Temperature Units
Celsius Thermocouple Type
J

FIG. 5B

Analog Input Configuration

Channel name: IC Sensor ▼ | Edit Name

Description: IC Sensor on Grey Box

Physical Quantity

Units: Deg F

Range:
- min: 0.00
- max: 500.00

☐ Coerce to Range

Sensor

Voltage Transducer

Units: V

Range:
- min: 0.00
- max: 5.00

Scaling Formula: Map Ranges ▼

DAQ Hardware

Device: Dev1:AT-MIO-16XE-50 ▼

Channel: 0 ▼   Pin #: <=>68 (ACH0), 34(ACH8)

Mode: Differential ▼

[Save]   [Return]

FIG. 8

Analog Input Configuration

Channel name: IC Sensor  Edit Name

Description: IC Sensor on Grey Box

Physical Quantity

Units: Deg F

Range:
min 0.00
max 500.00

☐ Coerce to Range

Sensor

Current Transducer

Units: mA

Range:
min 4.00
max 20.00

Scaling Formula: Map Ranges

DAQ Hardware

Device: Dev1:AT-MIO-16XE-50

Channel: 0     Pin #
<=>68 (ACH0),
34(ACH8)

Mode: Differential

Current Sense Resistor: 249 ohms

Save     Return

FIG. 12

Analog Input Configuration

Channel name: IC Sensor ▼  Edit Name

Description: IC Sensor on Grey Box

Physical Quantity

Units: Deg F

Range:
min 0.00
max 500.00

☐ Coerce to Range

Sensor

Resistance Transducer

Units: ohms

Range:
min 100.00
max 1000.00

Scaling Formula: Map Ranges ▼

DAQ Hardware

Device: Dev1:AT-MIO-16XE-50 ▼

Channel  Pin #
0 ▼ <=> 68 (ACH0),
         34 (ACH8)

Mode: Differential ▼

Excitation Current: User Value ▼

Current 1.00 mA

Save    Return

FIG. 13

Analog Input Configuration

Channel name: IC Sensor

Description: IC Sensor on Grey Box

Edit Name

Physical Quantity
Units: Deg F
Range:
min 0.00
max 500.00
☐ Coerce to Range

Sensor
Temperature: Thermocouple J
Units: mV
Range:
min -0.1562
max 1.3339

View TC Specs

DAQ Hardware
Device: Dev1:AT-MIO-16XE-50
Channel: 0 <=> Pin # 68 (ACH0), 34(ACH8)
Mode: Differential
CJC Type: User Value
CJC Temp: 25 deg C Save    Return

FIG. 14

Analog Input Configuration

Channel name: IC Sensor

Description: IC Sensor on Grey Box

Physical Quantity
Units: Deg F
Range:
 min 0.00
 max 500.00
☐ Coerce to Range

Sensor
Temperature: Thermocouple Custom
Edit Name
Units: mV
Range:
 min -0.1562
 max 1.3339
Scaling Formula: Map Ranges

DAQ Hardware
Device: Dev1:AT-MIO-16XE-50
Channel 0  Pin # 68 (ACH0), 34(ACH8)
Mode: Differential
CJC Type: User Value
CJC Temp 25 deg C Save    Return

FIG. 15

Analog Input Configuration

Channel name: IC Sensor ▼  Edit Name

Description: IC Sensor on Grey Box

Physical Quantity

Units: Deg F ▼

Range:
min  0.00
max  500.00

☐ Coerce to Range

Sensor

Temperature: RTD ITS-90 ▼

Units: ohms

Range:
min  91.92
max  203.56

Ro: 100 ohms

DAQ Hardware

Device: Dev1:AT-MIO-16XE-50 ▼

Channel: 0 ▼   Pin #
                  <=> 68 (ACH0),
                      34 (ACH8)

Mode: Differential ▼

Excitation Current: User Value ▼

Current: 1.00 mA

Save    Return

FIG. 16

DAQ Hardware

Device
Dev1: AT-MIO-16XE-50 ▼

Channel                Pin #
  0   ▼   <=>   68 (ACH0)
                34 (ACH8)

Mode
Differential ▼

CJC Type
Built-In (N/A) ▼

FIG. 19

DAQ Hardware

Device
Dev1: AT-MIO-16XE-50 ▼

Channel     Pin #
0 ▼   <=>   68 (ACH0)
             34 (ACH8)

Mode
Differential ▼

CJC Type
User Value ▼

CJC Temp  [ 25 ]  deg C

FIG. 20

DAQ Hardware

Device
Dev1: AT-MIO-16XE-50 ▼

Channel     Pin #
0 ▼  <=>  68 (ACH0)
            34 (ACH8)

Mode
Differential ▼

CJC Type
User Supplied ▼

CJC Channel name:
▼

FIG. 21

Analog Output Configuration

Channel name: AOut0 | Edit Name

Description: Connect this to AI Chan 2

Physical Quantity
Units: V
Range: max 0.00, min 5.00
Initial Value: 0.00
☐ Coerce to Range

Actuator — Voltage (0-5V)
Units: V
Range: min 0.00, max 5.00
Scaling Formula: Map Ranges

DAQ Hardware
Device: Dev1:AT-MIO-16XE-50
Channel: 0 <=> Pin # 22 (DAC0 OUT)

Save | Return

FIG. 22

Actuator

√Voltage
Voltage (0-5V)
Current
Current (4-20 mA)

Range:

min 0.00
max 5.00

Scaling Formula:
<None> ▼

FIG. 24

Digital I/O Configuration

Channel name: DIOA0 ▼  Edit Name

Description: Led AO on Grey Box

Digital Type: Read from Port ▼

Hardware

Device: Dev3: AT-AO-6 ▼

Port: DIO0-3 ▼

Initial State

| L | L | L | H |

Line: 0 1 2 3

Invert Signal?

| N | N | N | N |

Line: 0 1 2 3

Save    Return

FIG. 27

Digital I/O Configuration

Channel name: DIOA0 ▼ | Edit Name

Description: Led AO on Grey Box

Digital Type: Read from Line ▼

Initial State
Low
Line: 0

Invert Signal?
No
Line: 0

Hardware
Device: Dev1: AT-MIO-16XE-50 ▼
Port: DIO ▼
Port: 0 ▼ <=> Pin # 52(DIO0)

Save | Return

FIG. 28

Digital I/O Configuration

Channel name: DIOA0 ▼  Edit Name

Description: Led AO on Grey Box

Digital Type: Write to Port ▼

――― Hardware ―――
Device: Dev3: AT-AO-6 ▼
Port: DIO0-3 ▼

Initial State
| L | L | H | L |
Line: 0 1 2 3

Invert Signal?
| N | N | Y | N |
Line: 0 1 2 3

Save    Return

FIG. 29

Digital I/O Configuration

Digital I/O Configuration

Channel name: DIOA0 ▼   Edit Name

Description:
Led AO on Grey Box

Digital Type: Write to Line ▼

Hardware

Device: Dev1: AT-MIO-16XE-50 ▼

Port: DIO ▼

Line: 0 ▼   <=> Pin # 52(DIO0)

Initial State

Low
Line: 0

Invert Signal?

No
Line: 0

Save    Return

FIG. 30

Hardware

Device
Dev1: AT-MIO-16XE-50 ▼

Port: DIO ▼

Line: 0     <=> Pin # 52(DIO0)
1 (Cfg)
2 (Cfg)
3 (Cfg)
4 (Cfg)
5
6
7

FIG. 31

Custom Scale Configuration

Scale name: Nickel RTD ▼  Edit Name

Description: scale using lookup table for nickel RTD

Scale type: Table ▼

Table Values

| Raw Value | Scaled Value |
|-----------|--------------|
| 120       | 0            |
| 134.52    | 20           |
| 149.79    | 40           |
| 165.9     | 60           |
| 182.84    | 80           |
| 200.64    | 100          |

File...   Clear   Update Plot

Save      Return

FIG. 33

DAQ CONFIGURATION SYSTEM AND METHOD FOR CONFIGURING CHANNELS IN A DATA ACQUISITION DEVICE

BACKGROUND OF THE INVENTION

1. Field of the Invention

The present invention relates to data acquisition (DAQ) systems, and more particularly to a DAQ Configuration system and method for configuring DAQ device channels for the physical quantities being measured or generated by the data acquisition device.

2. Description of the Related Art

Scientists and engineers often use DAQ systems to perform a variety of functions, including test and measurement, laboratory research, process monitoring and control, data logging, analytical chemistry, test and analysis of physical phenomena, and control of mechanical or electrical machinery, to name a few examples.

A typical DAQ system comprises a computer system with DAQ hardware, one or more transducers, and possibly signal conditioning logic coupled between the transducers and the DAQ hardware. The transducers or other detecting means convert the physical phenomena being measured into electrical signals, such as voltage or current, measurable by the DAQ hardware. The transducers thus provide "field" electrical signals representing a process, physical phenomena, equipment being monitored or measured, etc. For example, detectors and/or sensors are used to sense the on/off state of power circuits, proximity switches, push-button switches, thermostats, relays or even the presence of positive or negative digital logic-level signals. Examples of transducers include thermocouples (temperature to voltage), RTDs (temperature to electrical resistance), strain gauges (strain to voltage), and microphones (sound to voltage).

The signal conditioning logic amplifies low-level signals and also isolates and filters signals for more accurate and safe measurements. After any signal conditioning is performed, the conditioned signals are provided to the DAQ hardware.

The DAQ hardware is typically an expansion card plugged into one of the I/O slots of the computer system. In another common DAQ system configuration, the DAQ hardware is coupled to the computer system via other means such as through a VXI (VME eXtensions for Instrumentation) bus, a GPIB (General Purpose Interface Bus), a serial port, or parallel port of the computer system.

The DAQ expansion card enables the computerized measurement and generation of real world analog and digital signals. The DAQ board typically includes one or more analog to digital (A/D) converters (ADCs), digital to analog (D/A) converters (DACs), digital I/O ports, and counter/timer circuits.

The DAQ hardware is configured and controlled by DAQ software executing on the computer system. The DAQ software for configuring and controlling the DAQ system typically comprises driver software and the DAQ application software, or the application. The driver software serves to interface the DAQ hardware to the application and is typically supplied by the manufacturer of the DAQ hardware or by a third party software vendor. The application is typically developed by the user of the DAQ system and is tailored to the particular function which the user intends the DAQ system to perform. The DAQ hardware manufacturer or third party software vendor sometimes supplies application software for applications which are common, generic or straightforward.

One problem encountered in creating a data acquisition application is that, in prior art systems, the user is required to create program code which configures the one or more DAQ channels for the particular application. This includes creating code to configure the channels for the physical quantity being measured, as well as the sensor/actuator type, desired scaling etc. The user is also many times required to create code to convert voltage readings into the physical units of interest.

Therefore, an improved DAQ configuration system and method is desired which provides a simpler and more convenient mechanism for configuring DAQ channels in a DAQ instrumentation system.

SUMMARY OF THE INVENTION

The present invention comprises a data acquisition (DAQ) channel configuration system and method, referred to as the DAQ Channel Wizard, for facilitating the creation of data acquisition applications. The present invention enables the user to create channel configurations which include information regarding a respective DAQ hardware channel, such as the physical phenomena being measured/generated and how the phenomena is being converted to units which can be measured/generated. The user then assigns a name to each respective channel configuration. This channel configuration name is then usable in a data acquisition application to specify the channel configuration, thus simplifying application development.

The method for configuring one or more channels on a data acquisition device thus comprises receiving at least one channel configuration specification from a user and assigning a name to the channel configuration in response to user input. For analog I/O, receiving the channel configuration specification preferably comprises receiving and storing input from a user regarding units and range of a physical quantity being measured/generated, how the physical quantity is being converted to units which can be measured/generated, and a selected channel of a data acquisition device. For digital I/O, receiving the channel configuration specification preferably comprises receiving and storing input from a user regarding a signal type that is being acquired/generated and the selected port/line of the data acquisition device. For digital I/O, the user can also preferably specify an initial value of an output and an invert signal option. The DAQ Channel Wizard displays various panels in a configuration window to enable the user to easily specify the respective channel configuration. After the channel configuration is received, the DAQ Channel Wizard then assigns a name to the channel configuration in response to user input.

After assigning a name to the channel configurations, the user then constructs a program which controls the data acquisition system. The program construction includes providing the assigned name which specifies the channel configuration for the selected channel of the data acquisition device. The program can then be executed to perform a data acquisition operation, wherein the executing includes using the channel configuration referenced by the assigned name in performing the data acquisition operation.

The user thus specifies a channel configuration and associated name using the DAQ Channel Wizard of the present invention prior to creating the program. The step of constructing the program does not require the user to create code to specify the channel configuration but rather only requires inputting the channel configuration name. Further, the program can execute in units of the physical quantity being measured/generated according to the channel configuration, and the user is not required to create code to operate in the units of the physical quantity being measured/generated.

Thus the present invention comprises an improved system and method for configuring channels on a data acquisition device, and more particularly, an improved system and method for creating data acquisition programs with reduced programming requirements.

BRIEF DESCRIPTION OF THE DRAWINGS

A better understanding of the present invention can be obtained when the following detailed description of the preferred embodiment is considered in conjunction with the following drawings, in which:

FIGS. 5A and 5B illustrate a graphical program, including a graphical diagram and front panel, which was developed according to the prior art;

FIG. 8 illustrates the Analog Input Configuration window which includes various input fields, including a channel name field, a physical quantity panel, a sensor panel, and a DAQ Hardware panel;

FIG. 12 illustrates the Analog Input Configuration window of FIG. 8 for a current transducer;

FIG. 13 illustrates the Analog Input Configuration window of FIG. 8 for a resistance transducer;

FIG. 14 illustrates the Analog Input Configuration window of FIG. 8 for a thermocouple transducer;

FIG. 15 illustrates the Analog Input Configuration window of FIG. 8 for a custom thermocouple transducer;

FIG. 16 illustrates the Analog Input Configuration window of FIG. 8 for an RTD sensor;

FIG. 19 illustrates the DAQ Hardware panel for a thermocouple sensor with "built-in" CJC type;

FIG. 20 illustrates the DAQ Hardware panel for a thermocouple sensor with "user value" CJC type;

FIG. 21 illustrates the DAQ Hardware panel for a thermocouple sensor with "user supplied" CJC type;

FIG. 22 illustrates the Analog Output Configuration window which includes various input fields, including a channel name, physical quantity panel, an actuator panel, and a DAQ Hardware panel;

FIG. 24 illustrates the actuator selections on the actuator panel of the Analog Output Configuration window of FIGS. 22 and 23;

FIG. 27 illustrates the Digital I/O Configuration window which includes various input fields, including a channel name, digital type, Hardware panel, Initial State panel and an Invert? Signal panel;

FIG. 28 illustrates the Digital I/O Configuration window with a "Read from Line" digital type;

FIG. 29 illustrates the Digital I/O Configuration window with a "Write to Port" digital type;

FIG. 30 illustrates the Digital I/O Configuration window with a "Write to Line" digital type;

FIG. 31 illustrates the line selections on the Hardware panel of the Digital I/O Configuration window of FIG. 27;

FIGS. 32–35 illustrate the Custom Scale Configuration window for Linear, Table, Polynomial, and Expression scale types.

DETAILED DESCRIPTION OF THE PREFERRED EMBODIMENT

DAQ System

Figure 1:
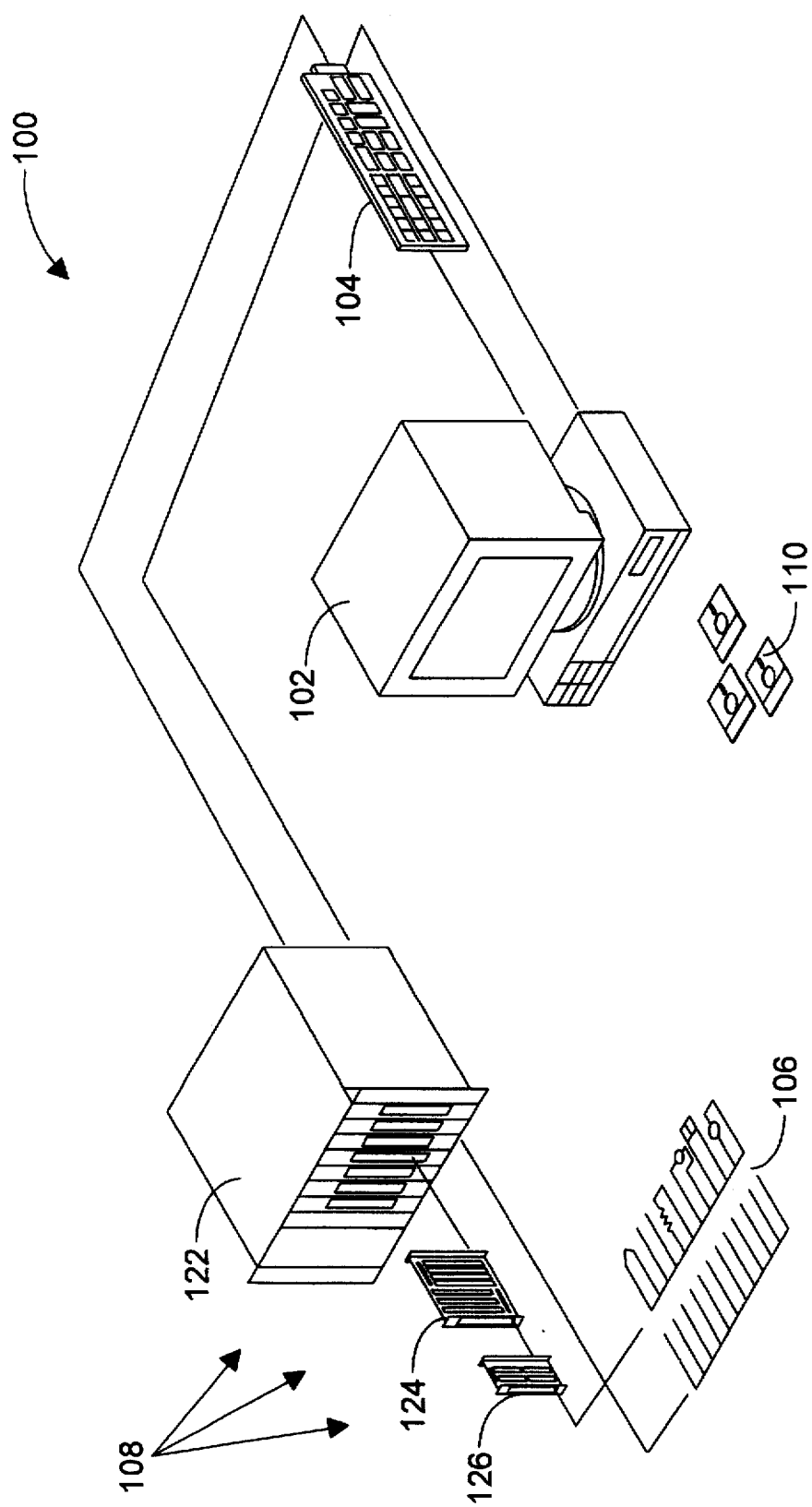
FIG. 1 is block diagram of a DAQ system according to the present invention.

Referring now to FIG. 1, an illustrative data acquisition (DAQ) system 100 according to the present invention is shown. The term "data acquisition" used in this specification is intended to encompass data generation as well as data acquisition, particularly as applied to instrumentation and process control systems.

The DAQ system 100 comprises a computer 102 having an operating system and other software, a DAQ device or DAQ hardware board 104 coupled to the computer 102, and transducers 106 or other detecting means which provide field electrical signals to/from the DAQ device 104, optionally through signal conditioning logic 108.

The computer 102 includes various standard components, including at least one central processing unit (CPU), memory, a hard drive, one or more buses, and a power supply. The computer 102 preferably includes a memory media, such as magnetic media, or floppy disk(s) 110, on which computer programs according to the present invention are stored. The software programs of the present invention are also stored in the system memory and/or hard drive of the computer 102 and executed by the CPU. The CPU executing code and data from the memory thus comprises a means for configuring and controlling channels on the DAQ device 104 according to the steps described below.

In one embodiment, the computer 102 comprises input/output (I/O) slots into which the DAQ device 104 is coupled. In the embodiment of FIG. 1, the DAQ device 104 is a DAQ board or DAQ card adapted for insertion into an expansion slot of the computer system 102. The DAQ board 104 is shown external to the computer system 102 in FIG. 1 for illustrative purposes. In another embodiment, the DAQ device 104 is coupled to the computer 102 by a VXI (VME Extensions for Instrumentation) chassis and bus, a GPIB (General Purpose Interface Bus), a serial port or a parallel port.

In one embodiment, the transducers 106 are coupled directly to the DAQ device 104. In another embodiment, the transducers 106 are conditioned by the signal conditioning circuitry 108 for presentation to the DAQ device 20 as shown. In the embodiment of FIG. 1, the signal conditioning circuitry 108 comprises an SCXI (Signal Conditioning Extensions for Instrumentation) chassis 122, one or more SCXI modules 124, and optionally one or more SCXI terminal blocks 126. SCXI is an open architecture, multichannel signal conditioning front-end system for DAQ devices. SCXI comprises an external chassis housing signal conditioning modules for amplifying, multiplexing, and isolating field signals. The signal conditioning modules advantageously reduce the introduction of noise into the signals transmitted to the DAQ device 104.

The transducers 106 and other detecting means provide the field signals representing a process, physical phenomena, equipment being monitored or measured, etc. to/from the DAQ device 104. Examples of the transducers 106 are strain gauges, thermocouples, thermistors, photoconductive cells, microphones, and piezoelectric transducers, among others.

The DAQ device 104 is configured to acquire or generate signals of distinct I/O types. In particular, the I/O types comprise analog input signals, analog output signals, digital input signals, digital output signals and counter/timer inputs and outputs. The analog input and output signals are received and generated, respectively, on analog "channels" of the DAQ device 104. The digital input and output signals are received and generated, respectively, on digital I/O "ports" of the DAQ device 104. Each channel, port or counter has an associated number which uniquely identifies it with respect to the DAQ device 104 on which it resides. Henceforth, the term "channel" is used to denote an analog channel, a digital port or line and/or counter.

Examples of DAQ device 104 are the following products available from NATIONAL INSTRUMENTS CORPORATION: the AT-MIO-16 series analog input boards, the AT-AO-6/10 series analog output boards, the PC-DIO-96 digital I/O board, and the PC-TIO-10 counter/timer I/O board. Examples of the SCXI circuitry 22 are the NATIONAL INSTRUMENTS CORPORATION SCXI-1000 4-slot chassis, the SCXI-100 32-channel multiplexer amplifier module, and SCXI-1160 16-channel power relay module.

Figure 2A:
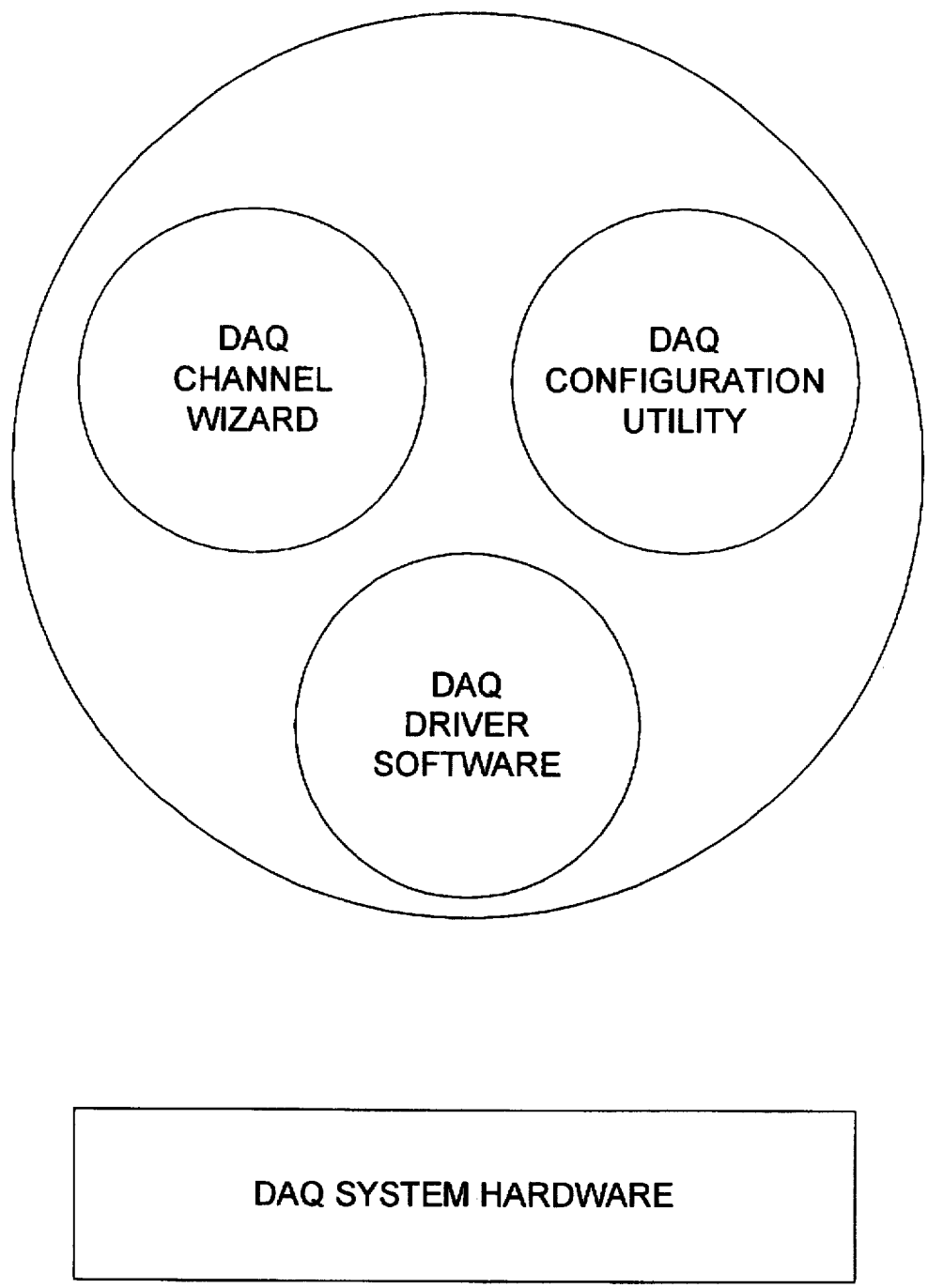
FIG. 2A illustrates the software components in a DAQ system, including the DAQ Channel Wizard according to the present invention.

FIG. 2—DAQ Software Components

FIG. 2 illustrates the software components comprised in the DAQ system according to the preferred embodiment. As shown, the DAQ system includes a DAQ Channel Wizard according to the present invention, also referred to as the DAQ channel configuration utility. The preferred embodiment of the DAQ Channel Wizard is the NI-DAQ Channel Wizard produced by National Instruments Corporation. As discussed below, the DAQ Channel Wizard is used to create channel configurations based on user input. The DAQ Channel Wizard assigns a name to each channel configuration based on user input, and this channel configuration name is then used in a DAQ application to represent the channel configuration that was created.

The DAQ system also preferably includes a DAQ configuration utility. The DAQ configuration utility is preferably the NI-DAQ Configuration Utility produced by National Instruments Corporation. The NI-DAQ Configuration Utility is used to configure DAQ boards and to assign each DAQ board a device number. If any SCXI devices are being installed, the NI-DAQ Configuration Utility is executed to input the SCXI configuration.

The NI-DAQ Configuration Utility creates a file that informs other DAQ configuration utilities which DAQ devices—DAQ plug-in boards, stand-alone DAQ products, or SCXI modules—the user has in the system, and how they are configured physically. This utility runs when the user installs or un-installs a DAQ device. For DAQ devices, the NI-DAQ Configuration Utility is used to configure addresses, interrupt levels, Direct Memory Access (DMA) channels, and other settings. For SCXI Chassis and Modules, the NI-DAQ Configuration Utility is used to configure addresses and other settings.

The DAQ system also includes DAQ driver software, preferably NI-DAQ driver software produced by National Instruments Corporation. The DAQ driver software interfaces between DAQ applications and the DAQ hardware being controlled by the DAQ application.

Figure 2B:
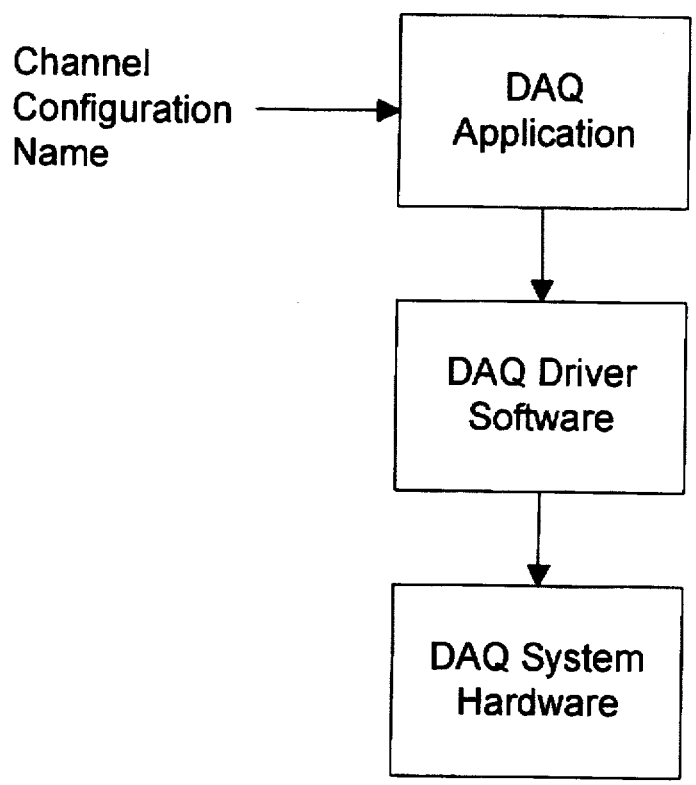
FIG. 2B illustrates a DAQ application receiving a channel configuration name created using the DAQ Channel Wizard according to the present invention.

FIG. 2B illustrates the relationship of a DAQ application with a channel configuration name created using the DAQ Channel Wizard of the present invention. As shown, the DAQ application executes through the DAQ driver software to control the DAQ system hardware. In other words, the DAQ application invokes functions in the DAQ driver software to control the DAQ system hardware. As shown, the DAQ application receives a channel configuration name created using the DAQ Channel Wizard. The DAQ application uses the channel configuration name to reference the channel configuration created and stored by the user during execution of the DAQ Channel Wizard. This greatly simplifies programming development.

Figure 3:
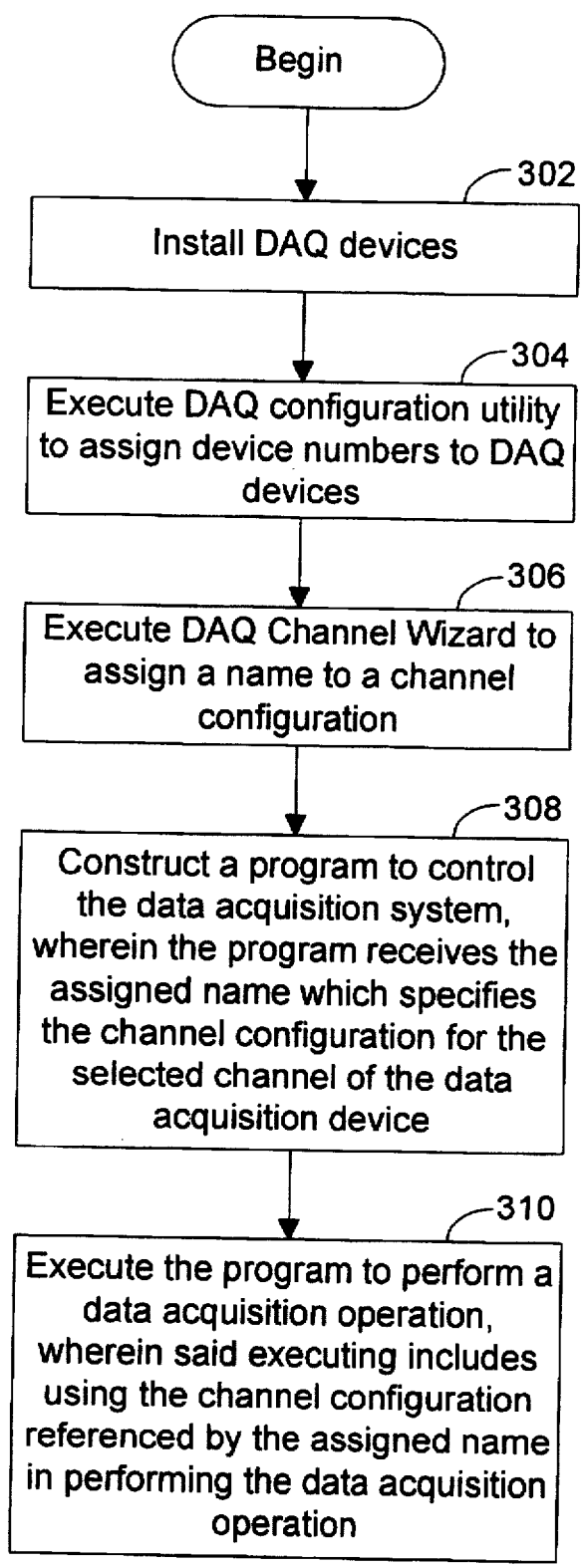
FIG. 3 is a flowchart diagram illustrating configuration of a DAQ system and creation of a DAQ program using the DAQ Channel Wizard of the present invention.

FIG. 3—DAQ System Configuration

Referring now to FIG. 3, a flowchart diagram is shown illustrating configuration of a DAQ system and execution of an application in the DAQ system. As shown, in step 302 the user physically installs the desired DAQ devices, as well as any SCXI devices, in the DAQ system.

In step 304 the user executes the DAQ configuration utility to assign device numbers to DAQ devices. As noted above, for DAQ devices the DAQ Configuration Utility is used to configure addresses, interrupt levels, Direct Memory Access (DMA) channels, and other settings. For SCXI Chassis and Modules, the NI-DAQ Configuration Utility is used to configure addresses and other settings.

Thus, before the DAQ Channel Wizard of the present invention is executed, the user preferably installs the desired DAQ boards in the system and configures these DAQ boards. The user preferably configures the DAQ boards by executing the NI-DAQ Configuration Utility from National Instruments to assign each DAQ board a device number. If any SCXI devices are being installed, the user executes the NI-DAQ Configuration Utility to input the SCXI configuration. Once the user has installed and configured the DAQ devices, the user launches the DAQ Channel Wizard.

In step 306 the user executes the channel configuration utility or DAQ Channel Wizard of the present invention. The DAQ Channel Wizard is used to create and store channel configurations for DAQ channels. The DAQ Channel Wizard assigns a name to each channel configuration based on user input, and this name can then be used in a DAQ application as described above with reference to FIG. 2B. The DAQ Channel Wizard can be used to create channel configurations for analog input, analog output, and digital I/O.

In step 308 the user constructs a program to control the data acquisition system. In other words, the computer system 102 constructs a program to control the data acquisition system in response to user input. The program is preferably constructed using the LabVIEW, LabWindows/CVI, or ComponentWorks programming environments from National Instruments Corporation. However, the program can be constructed in other graphical or text-based development systems.

The constructed program receives one or more assigned names which specify respective channel configurations for selected channels of the data acquisition device. In other words, when the user creates the program, the user includes one or more assigned channel configuration names in the program. This serves to include the respective channel configuration information in the program, i.e., the use of the channel configuration name in the program enables the program to access the channel configuration information previously specified by the user using the DAQ Channel Wizard. Thus, the user is not required to write or create program code to set up the channel configuration, but rather can merely use the channel configuration name previously assigned.

Figure 5A:
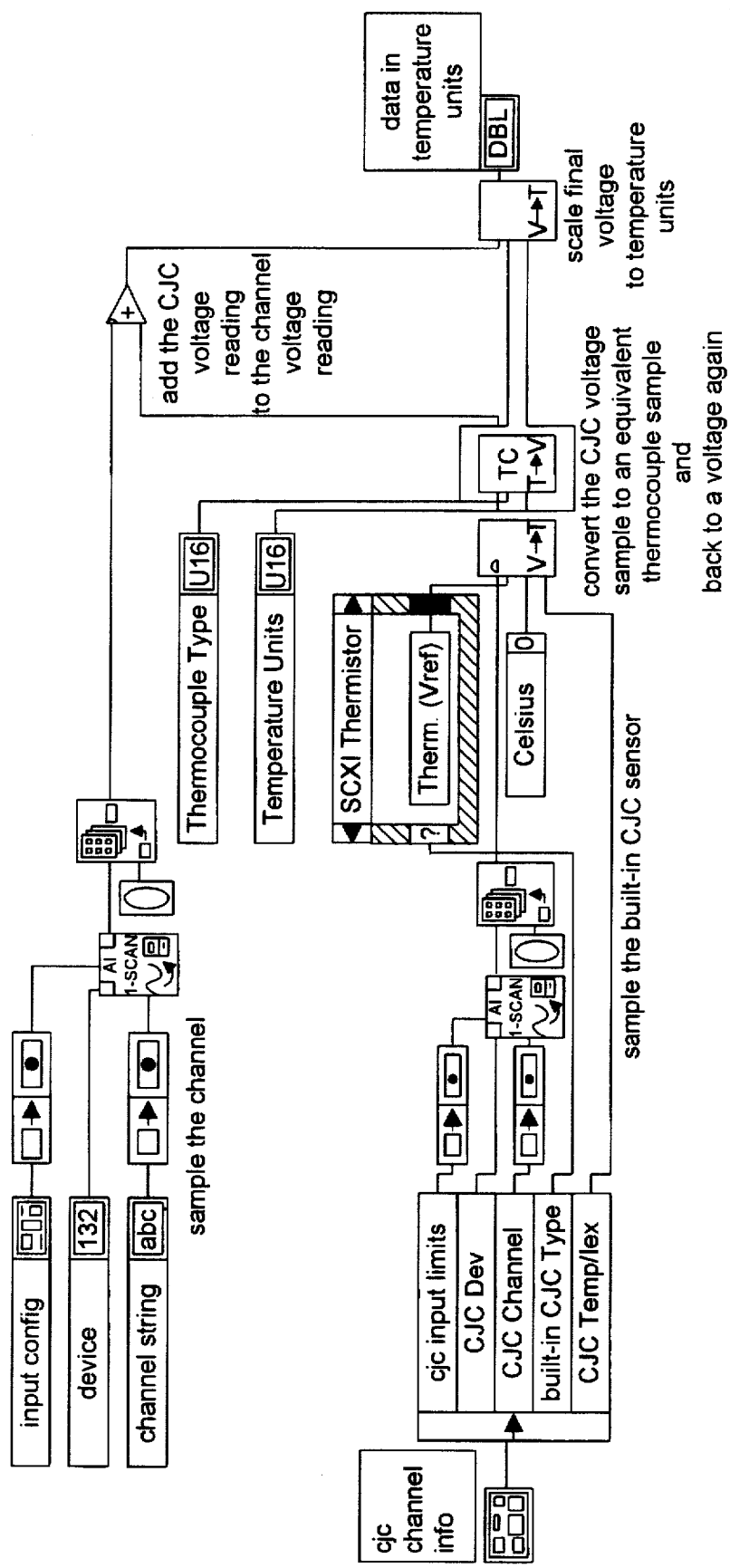
Figure 6A:
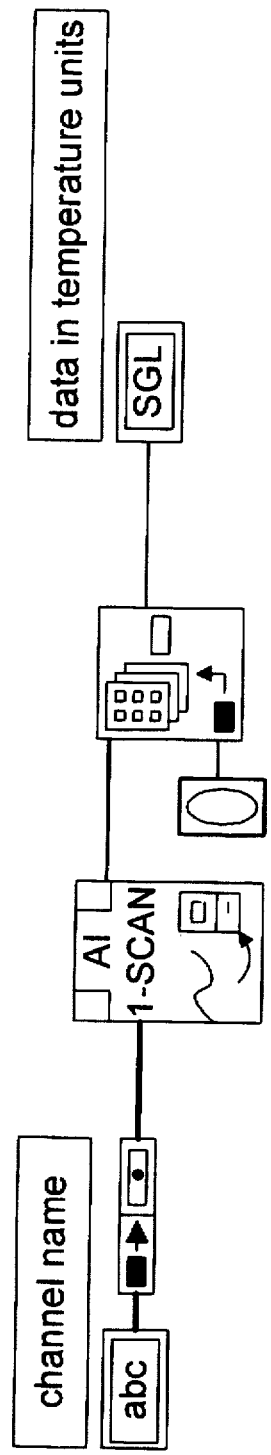
FIGS. 6A and 6B illustrate a graphical program, including a graphical diagram and front panel, which was developed using the DAQ Channel Wizard according to the present invention.
Figure 6B:
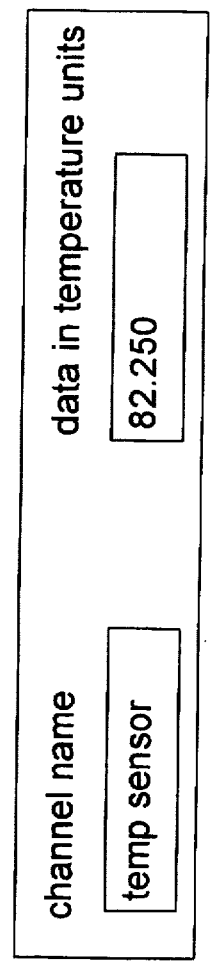

FIGS. 5 and 6 illustrate an example of a program created according to the prior art and created using the DAQ Channel Wizard according to the present invention, respectively. The examples of FIGS. 5 and 6 were created using the LabVIEW graphical programming environment from National Instruments Corporation. FIG. 5A illustrates a graphical program created using a prior art system without the DAQ Channel Wizard of the present invention, and FIG. 5B illustrates the corresponding front panel. As shown, the user is required to create a relatively large amount of graphical code to specify one or more channel configurations. FIG. 6A illustrates a graphical program where the DAQ Channel Wizard of the present invention was used, and FIG. 6B illustrates the corresponding front panel. As shown, when the DAQ Channel Wizard of the present invention is used to create channel configurations, program creation is much simpler, i.e., the code required to input the desired channel configuration is much less. As shown, the required programming to input the channel configuration merely requires inputting the channel configuration name into a node. This provides the program with the channel configuration information. In FIG. 5B, the channel configuration name is shown being input to a 1-scan node which performs a DAQ scanning operation.

Referring again to FIG. 3, in step 310 the program is executed to perform a data acquisition operation. This execution includes using the channel configuration information referenced by the assigned name in performing the data acquisition operation. Thus, during execution, the program uses the channel configuration name to access the channel configuration information previously assigned by the user. This channel configuration information is used in performing the data acquisition operation.

Figure 4:
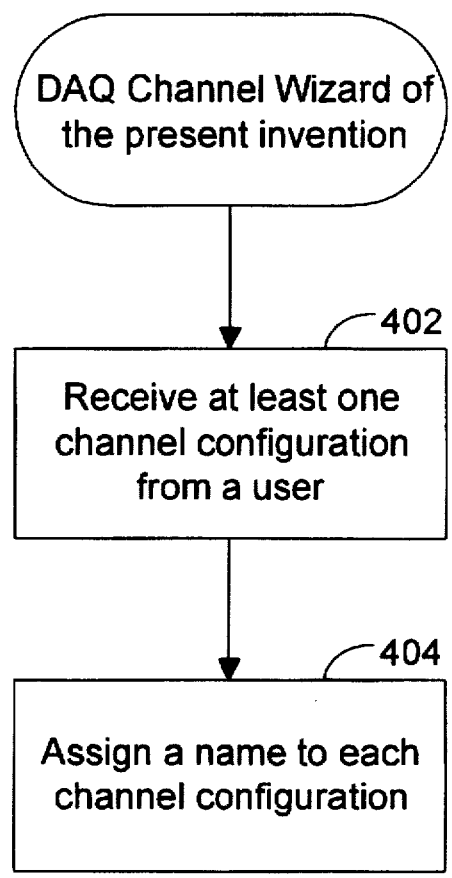
FIG. 4 is a flowchart illustrating operation of the DAQ Channel Wizard of the present invention.

FIG. 4—DAQ Channel Wizard of the Present Invention

Referring now to FIG. 4, a flowchart diagram is shown illustrating operation of the DAQ Channel Wizard of the present invention.

As shown, in step 402 the DAQ Channel Wizard receives at least one channel configuration from a user. The DAQ Channel Wizard receives channel configuration information from a user which defines a configuration for each of one or more channels. This step is discussed further below. In step 404 the DAQ Channel Wizard assigns a name to each channel configuration in response to user input. As discussed above, this channel configuration name is then used in a data acquisition program to provide the channel configuration information to the program in a simplified form. In other words, the channel configuration name is used to provide the channel configuration information to the data acquisition program, instead of requiring the user to specifically write or develop code to input the channel configuration information.

Figure 4A:
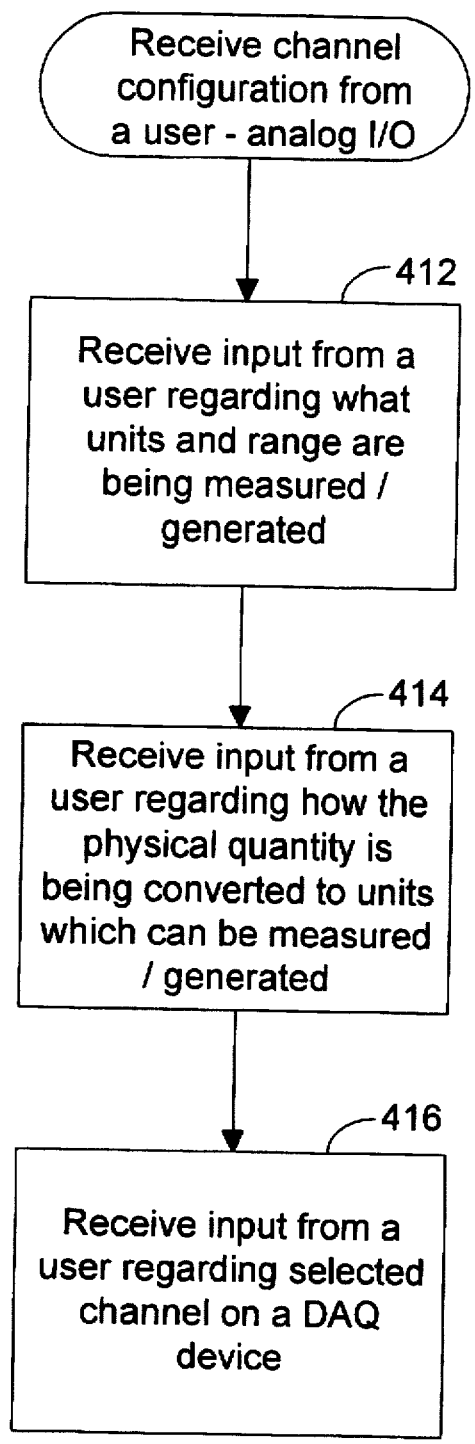
FIG. 4A is a flowchart illustrating receiving a channel configuration for analog I/O.

FIG. 4A illustrates step 402 of FIG. 4, i.e., illustrates receiving a channel configuration specification from a user. More particularly, FIG. 4A illustrates receiving a channel configuration specification from a user for analog input and analog output. As shown, in step 412 the DAQ Channel Wizard receives and stores input from a user regarding units and range of a physical quantity being measured/generated. If the user is specifying an input analog channel, then in step 412 the DAQ Channel Wizard receives and stores input from a user regarding units and range of a physical quantity being measured or acquired. For an analog input channel, this input is preferably received using a "Physical Quantity Panel", as shown on the "Analog Input Configuration" window of FIG. 8. If the user is specifying an output analog channel, then in step 412 the DAQ Channel Wizard receives and stores input from a user regarding units and range of a physical quantity being generated. For an analog output channel, this input is preferably received using a "Physical Quantity Panel", as shown on the "Analog Output Configuration" window of FIG. 22.

Figure 10:
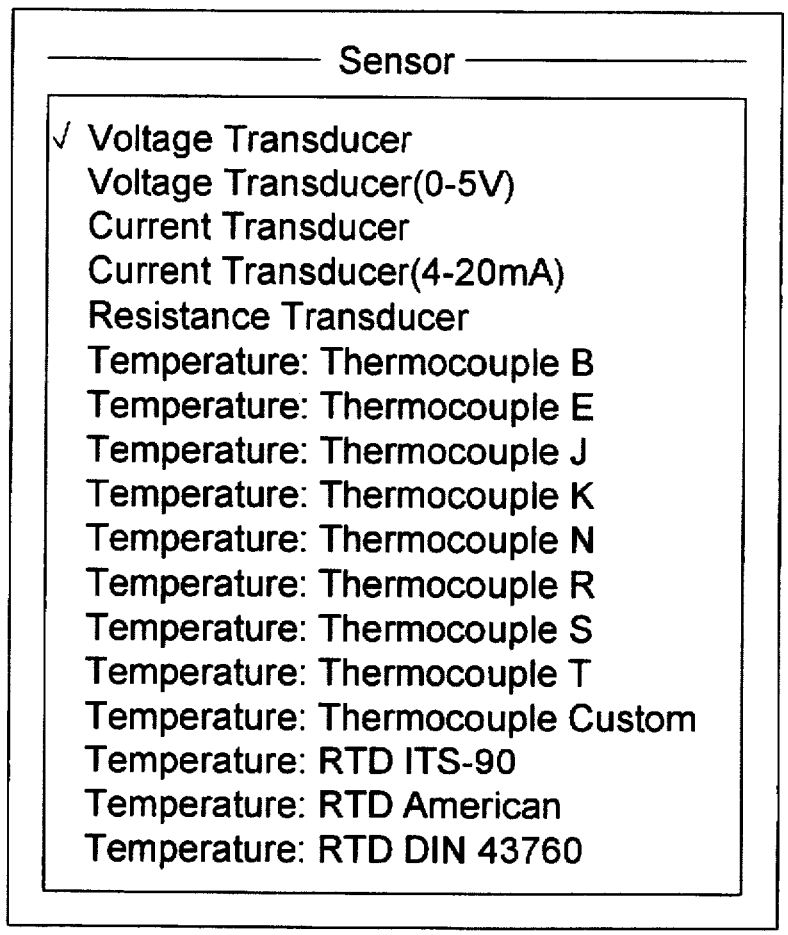
FIG. 10 illustrates the sensor options on the sensor panel of the Analog Input Configuration window of FIG. 8.

In step 414 the DAQ Channel Wizard receives and stores input from a user regarding how the physical quantity is being converted to units which can be measured/generated by the DAQ device. For an analog input channel, the input received specifies how the physical quantity is being converted to units which can be measured or acquired. This input is preferably received using a "Sensor Panel", as shown on the "Analog Input Configuration" window of FIG. 8. This includes receiving information from the user regarding the sensor type being used, and any scaling that is being performed. The sensor options for an analog input channel are shown in FIG. 10 and generally include the following categories: voltage input channel, current input channel, resistance input channel, known-type thermocouple channel, custom thermocouple channel, and RTD channel.

For an analog output channel, the input received in step 414 specifies how the physical quantity is being converted to units which can be generated. This input is preferably received using an "Actuator Panel", as shown on the "Analog Output Configuration" window of FIG. 22. This includes receiving information from the user regarding the actuator type being used and the scaling being used. The actuator options for an analog output channel are shown in FIG. 24 and generally include the following categories: voltage output channel and current output channel.

In step 416 the DAQ Channel Wizard receives and stores input from a user regarding a selected channel of a selected data acquisition device. In other words, the DAQ Channel Wizard receives and stores input regarding which DAQ device and which channel on the DAQ device is being assigned the channel configuration. For an analog input channel, this input is preferably received using a "DAQ Hardware Panel", as shown on the "Analog Input Configuration" window of FIG. 8. Under certain circumstances, for an analog input channel the DAQ Channel Wizard receives and stores input from a user regarding other hardware information, such as current excitation, cold junction compensation (CJC) source, and a current sense resistor value. For an analog output channel, the DAQ device and channel input is preferably received using the "DAQ Hardware Panel" as shown on the "Analog Output Configuration" window of FIG. 22.

Figure 4B:
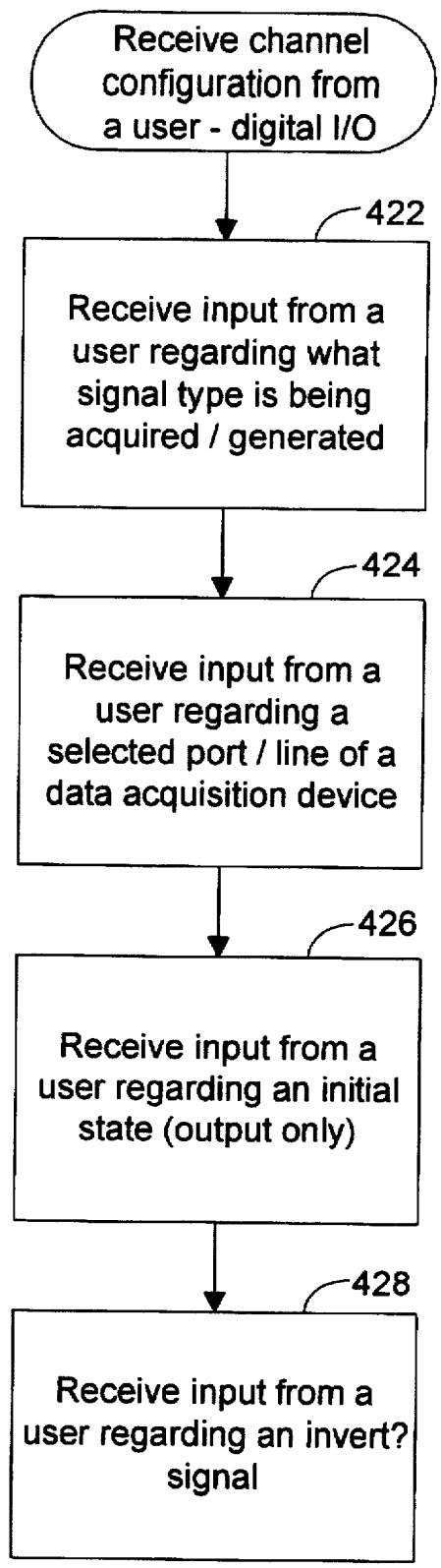
FIG. 4B is a flowchart illustrating receiving a channel configuration for digital I/O.

FIG. 4B illustrates step 402 of FIG. 4, i.e., illustrates receiving a channel configuration specification from a user, for digital I/O. As shown, in step 422 the DAQ Channel Wizard receives and stores input from a user regarding what signal type or digital type is being measured/generated. The possible signal types include a read from port, read from line, write to port, or write to line.

In step 424 the DAQ Channel Wizard receives and stores input from a user regarding which DAQ device and which port and/or line on the device is being assigned this channel configuration. In step 426, for digital output only, the DAQ Channel Wizard receives and stores input from a user regarding an initial state. In step 428 the DAQ Channel Wizard receives and stores input from a user regarding whether signal inversion is desired.

The DAQ Channel Wizard is used to define the physical quantities being measured or generated on each DAQ Hardware channel. The DAQ Channel Wizard also preferably determines whether the hardware is capable of making the measurement. The DAQ driver software then uses this information to configure the hardware to make a measurement or output a value for each channel in terms of the actual physical quantity.

In the present disclosure, a channel configuration is a collection of user-defined information associated with a selected DAQ channel. Using this information, the user can correctly configure the hardware to measure the sensor or drive the actuator. In addition, the sensor measurement or actuator output can be scaled to the physical quantity and vice versa.

As discussed above, the DAQ Channel Wizard can be used to configure the following channel types: Analog Input, Analog Output, and Digital Input/Output (I/O).

For analog input, a physical quantity is measured that can be directly sensed either by the DAQ device, or by using an external sensor to convert the physical quantity into one that can be directly sensed by the hardware. The user specifies the channel configuration by providing the following information: the physical quantity being measured, the sensor being used, the scaling of the sensor, and the DAQ device being used to make the measurement. The sensor selected determines the configuration requirements of the DAQ Hardware, as well as the valid physical quantities that can be measured. The DAQ Channel Wizard guides a user through the process of entering the information necessary to make a measurement for a specific DAQ device and channel.

For analog output, the user controls the physical quantity directly from the DAQ device, or the user uses the DAQ device to drive an external actuator which, in turn, controls the physical quantity. The user specifies the channel configuration by providing the following information: the physical quantity being controlled, the actuator being used, the scaling of the actuator, and the DAQ device being used to output the value. The actuator selected determines the configuration requirements of the DAQ Hardware, as well as the valid physical quantities that can be controlled. The DAQ Channel Wizard guides the user through the process of entering the information necessary to output the value for a specific DAQ device and channel.

For digital input/output (I/O), a sensor or actuator is not used, but rather digital lines or ports are used to sense or control digital signals. The user can apply some digital processing by providing an invert setting for the respective digital line or port. The DAQ Channel Wizard guides the user through configuring digital ports and lines for a specific DAQ device and digital I/O. Digital I/O differs from analog input and output in that digital I/O does not scale from or to a physical quantity. Instead, the system controls Boolean states—turning the state on or off, or sensing the on or off state of something. With the DAQ Channel Wizard, the user can individually control or sense discrete values by reading or writing digital lines. The user also can read or write digital ports, thereby controlling a set of lines together.

As mentioned above, the DAQ Channel Wizard guides the user through the process of entering channel configuration information and assigning a name to the channel configuration. FIGS. 7, 8 and 10–37 comprise screen shots illustrating operation of the DAQ Channel Wizard in prompting the user for the channel configuration information.

Figure 7A:
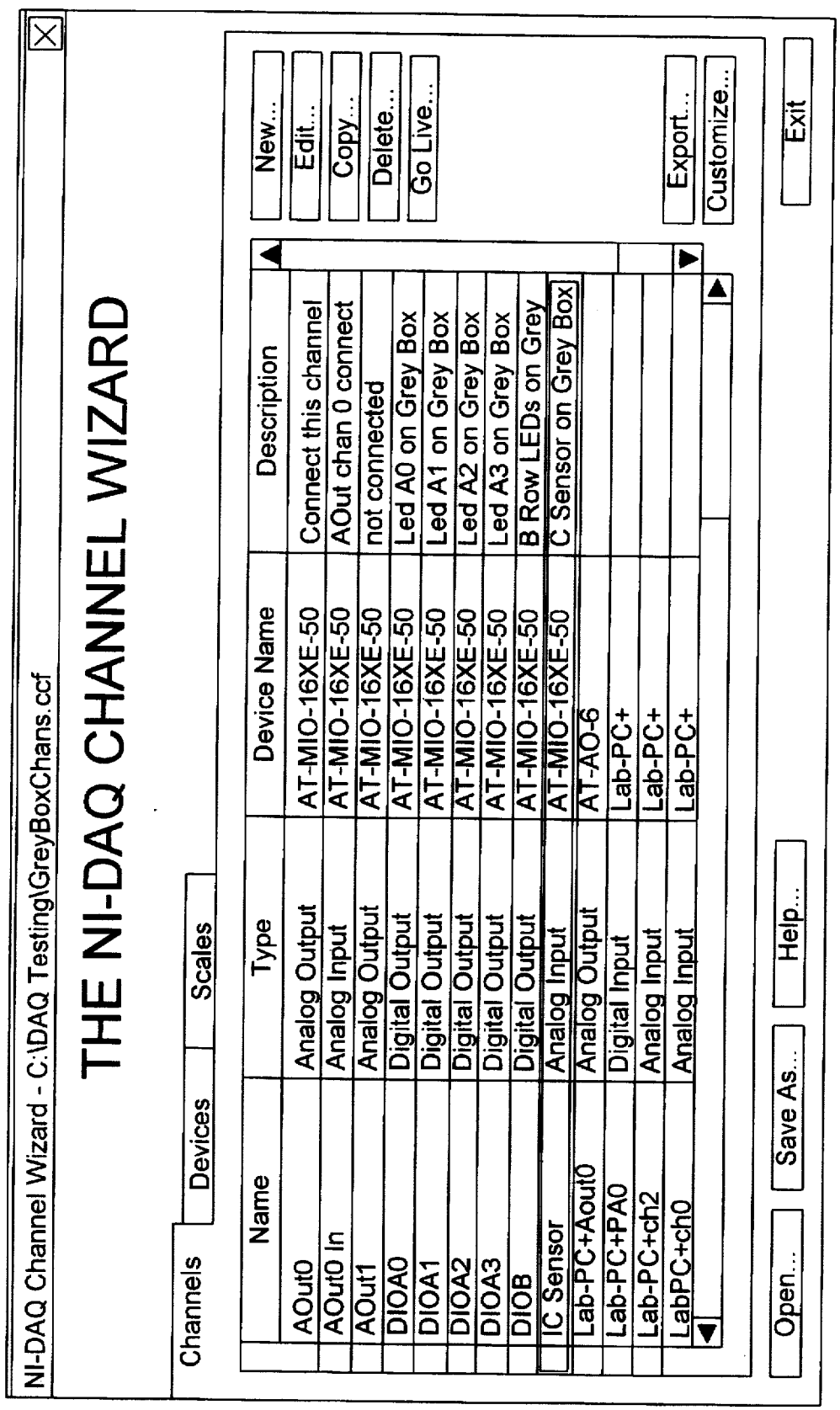
FIGS. 7A–7C illustrate the DAQ Channel Wizard main window.
Figure 7B:
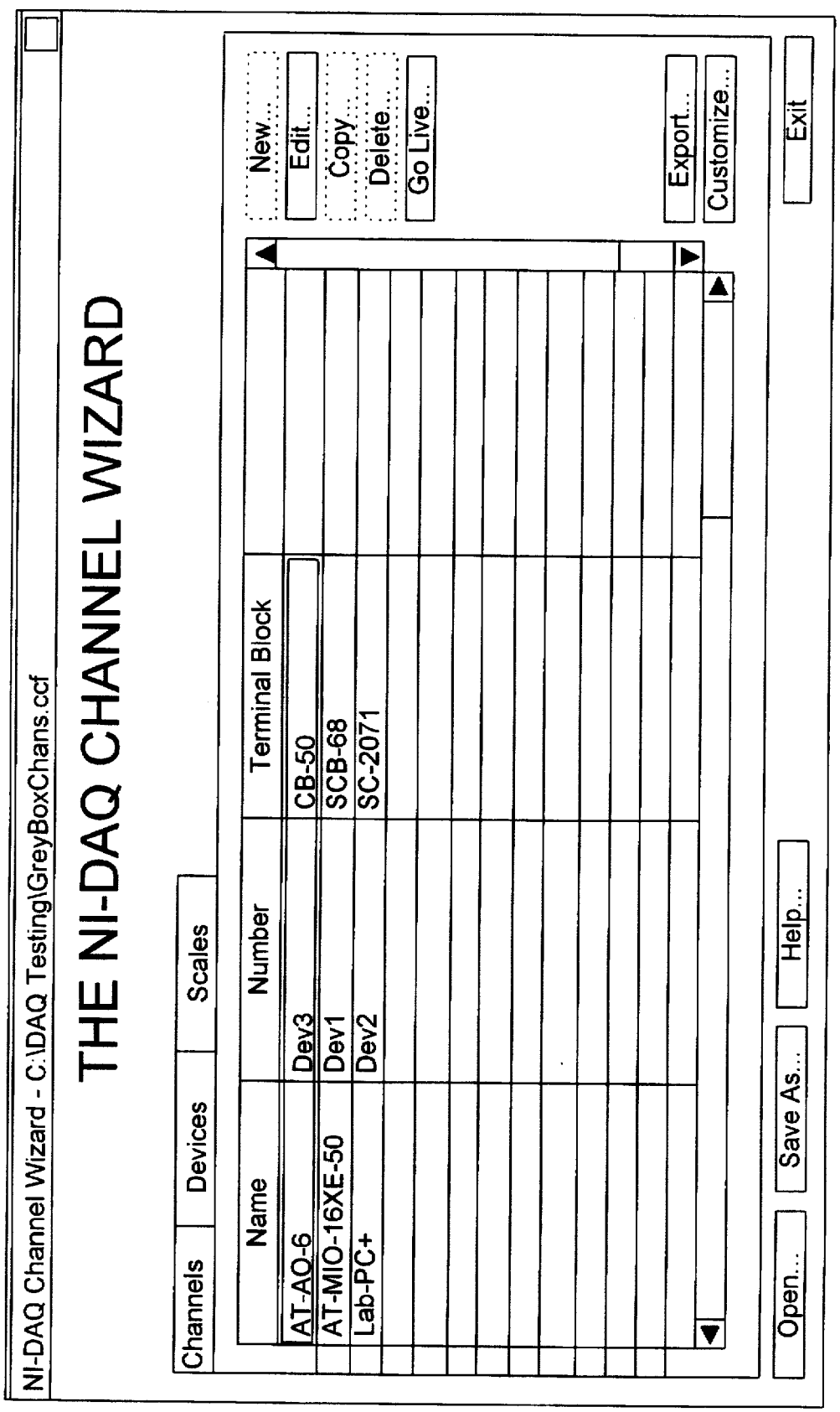
Figure 7C:
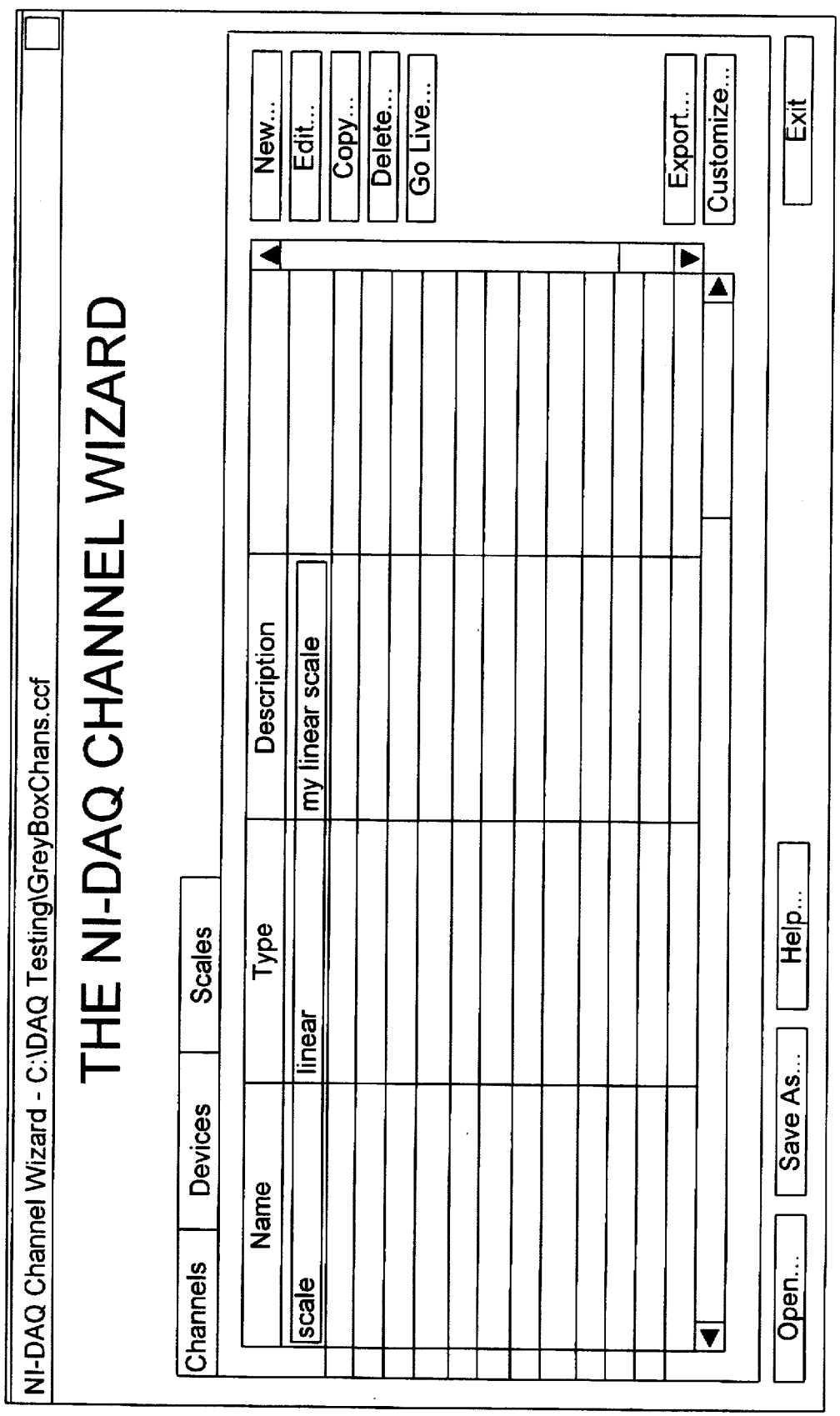

FIGS. 7A–7C: DAQ Channel Wizard Main Screen

FIGS. 7A–7C each illustrate the DAQ Channel Wizard main screen. As shown, the DAQ Channel Wizard window includes tabs for viewing channels, devices and scales. The channels, devices and scales views are shown in FIGS. 7A, 7B and 7C, respectively. The channels view enables the user to view all of the configured channels in the system. The device view enables the user to view all of the devices in the system. The scales view enables the user to view the user-defined custom scales.

Once the user has launched the DAQ Channel Wizard, the user can open an existing or new channel configuration file. The user chooses a file name and selects "Open". The DAQ Channel Wizard opens the main screen, shown in FIG. 7, displaying an overview of the system. If the file is a new file, no channel configurations are listed. As the user makes changes in the channel configuration, the DAQ Channel Wizard updates the current file. The DAQ Channel Wizard creates a backup .bak file whenever an existing DAQ Channel Wizard file is opened. If the user desires to discard all changes, then the user preferably exits the DAQ Channel Wizard and renames the .bak file to a DAQ Channel Wizard file.

When the user creates a new channel configuration file, the DAQ Channel Wizard prompts the user for additional information about the system device configuration, specifically which terminal blocks, if any, are connected to the DAQ plug-in boards 104. The DAQ Channel Wizard also prompts the user for any CJC jumpers set on the terminal blocks. The DAQ Channel Wizard opens a Device Terminal Blocks dialog box (not shown), where the user selects the terminal block and CJC jumper state for each plug-in DAQ device. This information is not entered as part of the NI-DAQ Configuration information for plug-in boards, so the DAQ Channel Wizard prompts the user for this information in order to configure channels correctly.

FIG. 7A illustrates the Channels view of the DAQ Channel Wizard main screen, i.e., illustrates the Channels tab. The Channels tab displays the currently defined channels, including a selection of attributes for each channel. From this view, the user can: create a new channel configuration, edit a channel configuration, copy a channel configuration, delete a channel configuration, customize the channel table view, and export the contents of the view to a file.

The Channels view also displays whether or not a given channel configuration is valid. If a channel configuration is invalid, the left-hand column contains the word "Bad" next to the channel name. Invalid channel configurations occur for several reasons including the following: the channel is already selected by another channel configuration, the channel is reserved by the DAQ system, or the device associated with the channel is not in the system or has been changed.

Reserved channel situations include where: a channel is configured for differential input, and the negative channel pair number is reserved; SCXI is connected to the DAQ board, and one or more of the board's analog input channels are used by the SCXI connection; or a terminal block has channel 0 connected to a CJC sensor, and this channel is thus reserved.

If no channels have yet been configured, or a new channel configuration file is being created, the Channels view table display is empty. Edits are saved to the channel configuration file as they are made, rather than saving all the changes at once. A backup of the DAQ Configuration Wizard file is created whenever an existing file is opened.

FIG. 7B illustrates the Devices view of the DAQ Channel Wizard main screen, i.e., illustrates the Devices tab. The Devices view of the DAQ Channel Wizard displays the DAQ devices in the system, including a selection of attributes for each device. These devices were configured in the NI-DAQ Configuration Utility as described above and are recognized by the DAQ Channel Wizard. The user must first run the NI-DAQ Configuration Utility to configure DAQ devices before the DAQ Channel Wizard recognizes them in the system. From this view, the user can edit a device configuration, customize the device table view, and export the contents of the view to a file.

The device number attribute column contains information about where the device is located in the system. DevX indicates it is a plug-in board or DAQPad assigned board number X by the NI-DAQ Configuration Utility. $DevX_{13}$ SCY_MDZ indicates it is a SCXI module in position Z, in chassis Y and is connected to plug-in board device X. A prefix of Dev0 indicates the DAQ product is associated with a remote SCXI system which does not contain a SCXI-1200.

If a device does not work with the DAQ Channel Wizard, the left-hand column contains the string NS next to the device name. The DAQ Channel Wizard displays the device in this view, but the user cannot select the device when channels are configured.

FIG. 7C illustrates the Scales view of the DAQ Channel Wizard main screen, i.e., illustrates the Scales tab. The Scales view of the DAQ Channel Wizard displays the custom scales the user defined as part of the analog input or output channel conversion, including a selection of attributes for each scale. Custom scales provide the more advanced scaling or converting the DAQ Software needs to perform when measuring or outputting a value. If only built-in sensor types are used, such as thermocouples, or simple linear range matching conversion is performed between the sensor or actuator range and the physical quantity, this table display is empty. From this view, the user can create a new scale, edit a scale, copy a scale, delete a scale, customize the scale table view, export the contents of the view to a file. The user can also create or edit a scale from the Analog Input and Analog Output Configuration screens.

Analog Input Channel Configuration

The DAQ Channel Wizard Channel view shown in FIG. 7 can be used to configure an analog input channel. When the user desires to configure an analog input channel, the user presses the New ... button and selects Analog Input, or clicks on the row of an existing analog input channel configuration and selects Edit .... These actions invoke the Analog Input Configuration dialog box, shown in FIG. 8.

The Analog Input Configuration dialog box in FIG. 8 includes panels comprising input fields for the Physical Quantity, the Sensor/Transducer, and the DAQ Hardware. The Analog Input Configuration dialog box of FIG. 8 is thus modeled after the analog input channel configuration shown in FIG. 9A, which shows an example graphical representation of the Physical Quantity, the Sensor/Transducer, and the DAQ Hardware. In the dialog box of FIG. 8, the user assigns or edits a name for a desired channel configuration. This channel always is referred to by the assigned name until it is changed. The user also can enter a description for the channel for documentation or mnemonic purposes.

Whenever the user changes the Sensor or DAQ device being used to measure a specific physical quantity, it may also be necessary for the user to change other settings in the Sensor and DAQ Hardware panels.

Physical Quantity Panel

As shown in FIG. 8, the Physical Quantity panel comprised in the Analog Input Configuration dialog box is used to define the units and range of the physical quantity the user is measuring with a given DAQ device channel. The user also can enable the Coerce to Range option for the channel. When this option is selected, the DAQ software measuring the channel returns a value within the range, even if the raw value, measured from the DAQ hardware and scaled to physical engineering units, is out of range. The DAQ software also uses the range to detect an out of range condition.

Sensor Panel

The Sensor panel comprised in the Analog Input Configuration dialog box of FIG. 8 is used to select the sensor type to connect to the DAQ channel. The various sensor types are shown in FIG. 10. The sensor the user selects determines the user control over how the scaling is done to convert from the sensor measurement to the physical quantity.

The sensor the user selects controls the sensor units displayed for this channel. The selected sensor also controls the physical quantity unit the user can select. For example, if the user selects a temperature measurement sensor, then only temperature units can be selected for the physical quantity unit. Some sensor selections have pre-selected ranges. The sensor range automatically changes to the appropriate range in terms of sensor units when the user selects one of these sensors.

Figure 11:
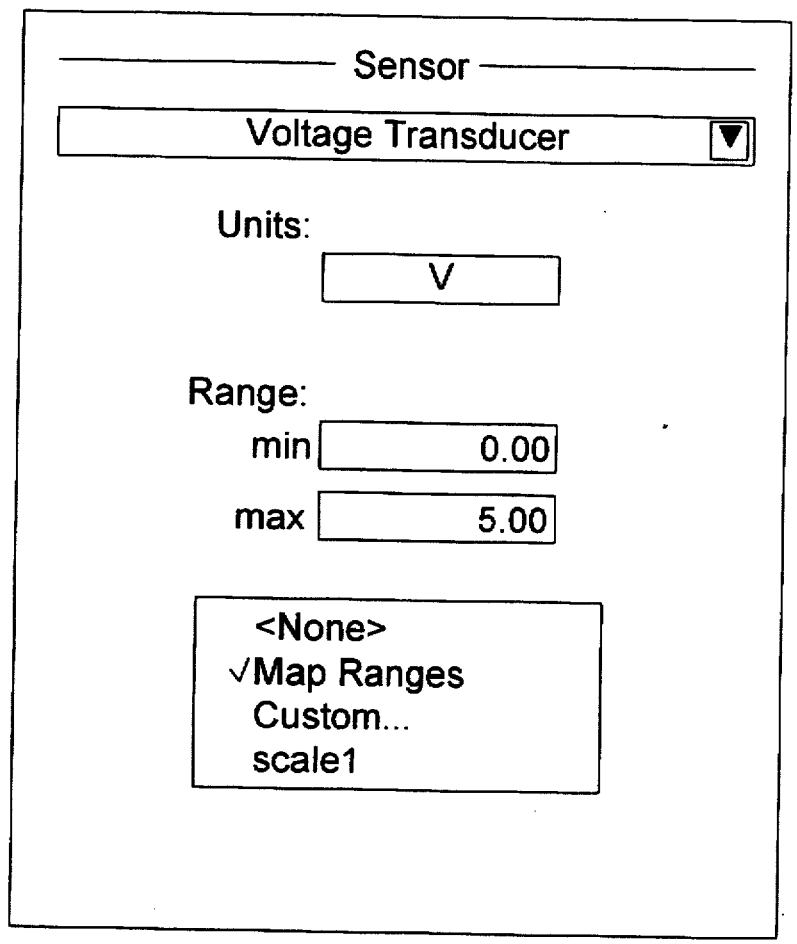
FIG. 11 illustrates the scaling options on the sensor panel of the Analog Input Configuration window of FIG. 8.

For sensor scaling, standard RTD and thermocouple measurement options already contain defined scaling formulas, so the user does not choose the conversion. Voltage, current, resistance, and custom thermocouple measurement options provide the user complete control over how the sensor is scaled. FIG. 11 lists the user's scaling options.

The DAQ Channel Wizard sensor options include the following Sensor Types: Voltage Input Channel; Current Input Channel; Resistance Input Channel; Known-Type Thermocouple Channel; Custom Thermocouple Channel; and RTD Channel.

1. Voltage Input Channel

The user configures a voltage input channel by selecting the "Voltage Transducer" or "Voltage Transducer (0 to 5V)" sensor options in the sensor panel of the Analog Input Configuration dialog box of FIG. 8. Either of these selections automatically sets the sensor units to V. A voltage transducer or sensor converts the physical quantity the user is measuring to volts.

When the user selects the Voltage Transducer (0 to 5V) option, the DAQ Channel Wizard automatically sets the sensor range to be 0 to 5V. When the user selects the Voltage Transducer option, the user enters the minimum and maximum values for the voltage transducer range. The DAQ Channel Wizard then uses the Scaling Formula selected to convert the voltage measured at the sensor output to the physical quantity.

2. Current Input Channel

As shown in FIG. 12, the user configures a current input channel by selecting the "Current Transducer" or "Current Transducer (4 to 20 mA)" sensor options in the sensor panel of the Analog Input Configuration dialog box of FIG. 8. Either of these selections automatically sets the sensor units to mA. A current transducer or sensor converts the physical quantity the user is measuring to current.

When the user selects the Current Transducer (4 to 20 mA) option, the DAQ Channel Wizard automatically sets the sensor range to be 4 to 20 mA. When the user selects the Current Transducer option, the user enters the minimum and maximum values for the current transducer range. The DAQ Channel Wizard then uses the Scaling Formula selected to convert the current measured at the sensor output to the physical quantity.

When the user selects a current transducer but the DAQ device the user has selected cannot directly measure current, the user also must enter the value of the Current Sense Resistor the user has wired to the selected channel. The DAQ Channel Wizard determines whether the user's DAQ device can directly measure current, and if not, queries the user for the Current Sense Resistor value.

3. Resistance Input Channel

As shown in FIG. 13, the user configures a resistance input channel by selecting the "Resistance Transducer" sensor option in the sensor panel of the Analog Input Configuration dialog box of FIG. 8. This selection automatically sets the sensor units to ohms. A resistance transducer or sensor converts the physical quantity the user is measuring to resistance.

When the user selects the Resistance Transducer option, the user enters the minimum and maximum values for the resistance transducer range. The DAQ Channel Wizard then uses the Scaling Formula to convert the resistance measured at the sensor output to the physical quantity.

When the user selects a resistance transducer but the DAQ device the user has selected cannot directly measure resistance, the user must select an Excitation Current value. The DAQ Channel Wizard determines whether the user's DAQ device can directly measure resistance, and if not, queries the user for the Excitation Current value. This value can be from a set of excitation currents available for the user's selected device, or from an excitation current the user supplies externally in order to measure resistance. The user selects or enters the excitation current being used for this channel.

4. Known-Type Thermocouple Channel

As shown in FIG. 14, the user configures a known-type thermocouple channel by selecting one of the "Temperature: Thermocouple" sensor options in the sensor panel of the Analog Input Configuration dialog box of FIG. 8. A thermocouple sensor converts a temperature value to a voltage. The DAQ Channel Wizard can configure B, E, J, K, N, R, S, and T type thermocouples, as well as Custom thermocouples.

When the user selects a thermocouple sensor, the DAQ Channel Wizard recognizes that the user is measuring temperature, and lists the following unit choices for the Physical Quantity: Deg C. (degrees Celsius or Centigrade); Deg F. (degrees Fahrenheit); Deg K (degrees Kelvin); and Deg R. (degrees Rankine)

When the user selects a thermocouple sensor of a known type, the DAQ Channel Wizard automatically calculates the voltage range from the temperature range the user has selected in the selected Physical Quantity. The DAQ Channel Wizard uses this voltage range to set the DAQ Hardware to measure the temperature. The DAQ Channel Wizard uses built-in thermocouple formulas for converting thermocouple types B, E, J, K, N, R, S, and T.

Thermocouple measurement is a relative temperature measurement. To measure thermocouples, the user compares the voltage measured at the thermocouple to the ambient temperature on the board or terminal block to which the thermocouple is connected. This comparison is called cold junction compensation (CJC). As part of configuring the thermocouple input channel, the user must select the CJC Type on the DAQ Hardware panel.

5. Custom Thermocouple Channel

As shown in FIG. 15, the user configures a custom thermocouple channel by selecting the "Thermocouple: Custom" sensor option in the sensor panel of the Analog Input Configuration dialog box of FIG. 8. When the user selects the Thermocouple: Custom option, the user specifies the Scaling Formula to convert the voltage measured at the sensor output to the selected physical quantity.

When the user selects a thermocouple sensor, the DAQ Channel Wizard recognizes that the user is measuring temperature, and lists the following unit choices for the Physical Quantity: Deg C. (degrees Celsius or Centigrade). Deg F. (degrees Fahrenheit); Deg K (degrees Kelvin); and Deg R. (degrees Rankine) Thermocouple measurement is a relative temperature measurement. To measure thermocouples, the user compares the voltage measured at the thermocouple to the ambient temperature on the board or terminal block to which the user has connected the thermocouple. This comparison is called cold junction compensation (CJC). As part of configuring the thermocouple input channel, the user must select the CJC Type on the DAQ Hardware panel.

For both Known-Type and Custom thermocouple selections, the DAQ Channel Wizard displays several options for selecting the CJC Type, these being: Built-In, User Supplied, and User Value. The user selects "built in" as the CJC type if the DAQ device or its terminal block contains a CJC sensor. The user selects the "user supplied" option as the CJC type if it is desired to use one of the input channels as a CJC channel. At least one channel must be configured for temperature measurement to select this option. The user connects this channel to a sensor which reads the ambient temperature at the location where the thermocouple channel is terminated. The DAQ Channel Wizard displays the available temperature analog input channels configured to measure temperature in Degrees C., F., K, and R. in the CJC channel menu ring. The CJC channel menu ring lists the possible CJC channel sources. Any analog input channel which has Deg x, where x is either C, F, K, and R, as its physical signal units is included in this menu. The user selects "User Value" as the CJC type if an ambient temperature sensor is not available for CJC. With this option the ambient temperature is not measured, but rather is guessed at.

The user also can use the View TC Specs button to see the mricroVolt range and error range associated with the conversion formula for each thermocouple type. The conversion formula error is much lower than the DAQ device measurement error. The CJC temperature reference error ranges from ±0.2 to 0.5 Deg C. (0 to 55 Deg C.).

6. RTD Channel

As shown in FIG. 16, the user configures a Resistive Temperature Device (RTD) channel by selecting one of the "Temperature: RTD" sensor options in the sensor panel of the Analog Input Configuration dialog box of FIG. 8. A RTD sensor converts a temperature value to a resistance. The DAQ Channel Wizard can configure Platinum RTD types ITS-90, American, and DIN 43760. The DAQ Channel Wizard then uses built-in Platinum RTD formulas for converting each RTD type.

When the user selects a RTD sensor, the DAQ Channel Wizard recognizes that the user is measuring temperature, and lists the following unit choices for the Physical Quantity: Deg C. (degrees Celsius or Centigrade); Deg F. (degrees Fahrenheit); Deg K (degrees Kelvin); and Deg R. (degrees Rankine).

When the user selects a RTD sensor, the DAQ Channel Wizard automatically calculates the resistance range from the temperature range the user selected in the physical quantity. The DAQ Channel Wizard uses this resistance range to set the DAQ Hardware to measure the temperature.

In addition to selecting the RTD type, the user must enter the Ro value for the RTD. The Ro value is the resistance in ohms for the RTD at 0 Degrees Celsius. RTD measurement is a resistance measurement. When the user selects a RTD sensor but the DAQ device the user has selected cannot measure resistance directly, the user must select an Excitation Current value. The DAQ Channel Wizard determines whether the user's DAQ device can directly measure resistance, and if not, queries the user for the Excitation Current value. This value can be from a set of excitation currents available for the selected device, or from an excitation current the user supplies externally in order to measure resistance. The user selects or enters the excitation current being used for this channel.

Platinum RTD Formula

The scaling for the Platinum RTD types ITS-90, American, and DIN 43760 is done according to the following formula:

$$\text{Temperature (Deg C)} = \frac{2 \cdot (Rrtd - Ro)}{Ro \cdot \left(A + \sqrt{A^2 + 4B\left(\frac{Rrtd}{Ro} - 1\right)}\right)}$$

where A, B, and C are coefficients for the Callendar-Van Dusen equation for Platinum RTDs that gives RTD resistance as a function of temperature.

$$Rrtd = Ro[1 + At + Bt^2 + C \cdot (t-100) \cdot t^3]$$

where
Rrtd=resistance of the RTD
Ro=RTD resistance at 0 Deg C.

$$A = \text{alpha} \cdot \left(\frac{1 + \text{delta}}{100}\right)$$

$$B = \frac{-\text{alpha} \cdot \text{delta}}{100^2}$$

$$C = \frac{-\text{alpha} \cdot \text{beta}}{100^4} \text{ for temperature above 0 Deg C, beta} = 0.$$

This equation reduces to the quadratic formula shown above for which we have found the appropriate root; therefore, this function is only for measuring temperatures above 0 Deg C. This table displays the coefficients for each of the built-in RTD types.

| Standard | Temperature Coefficient (alpha) | A | B | C |
| --- | --- | --- | --- | --- |
| DIN 43760 | 0.003850 | 3.9080E-3 | -5.8019E-9 | -4.2735E-12 |
| American | 0.003911 | 3.9692E-3 | -5.8495E-9 | -4.2325E-12 |
| ITS-90 | 0.003926 | 3.9848E-3 | -5.8700E-9 | -4.0000E-12 |

The user also can use his own custom RTD conversion for Platinum or non-Platinum RTDs. For this case, the user selects Resistance Transducer (a RTD is a resistive device) as the sensor type.

DAQ Hardware Panel

The DAQ Hardware panel in the Analog Input Configuration dialog box of FIG. 8 is used to select which DAQ device (DAQ plug-in board, stand-alone DAQ product, or SCXI module) and which channel on the device the user is assigning to this channel configuration. The user also can select the input mode for the DAQ boards the user chooses. The Device menu lists all devices in the user's system with analog input channels. The user selects the DAQ device first and the channel second.

The options on the DAQ Hardware panel change depending on which sensor the user has selected. The DAQ Channel Wizard determines whether the sensor the user has selected measures volts, current, or resistance, the quantities the user can directly measure with a DAQ device. If the user uses a thermocouple to measure temperature, the user must supply additional information in the DAQ Hardware panel.

Figure 17:
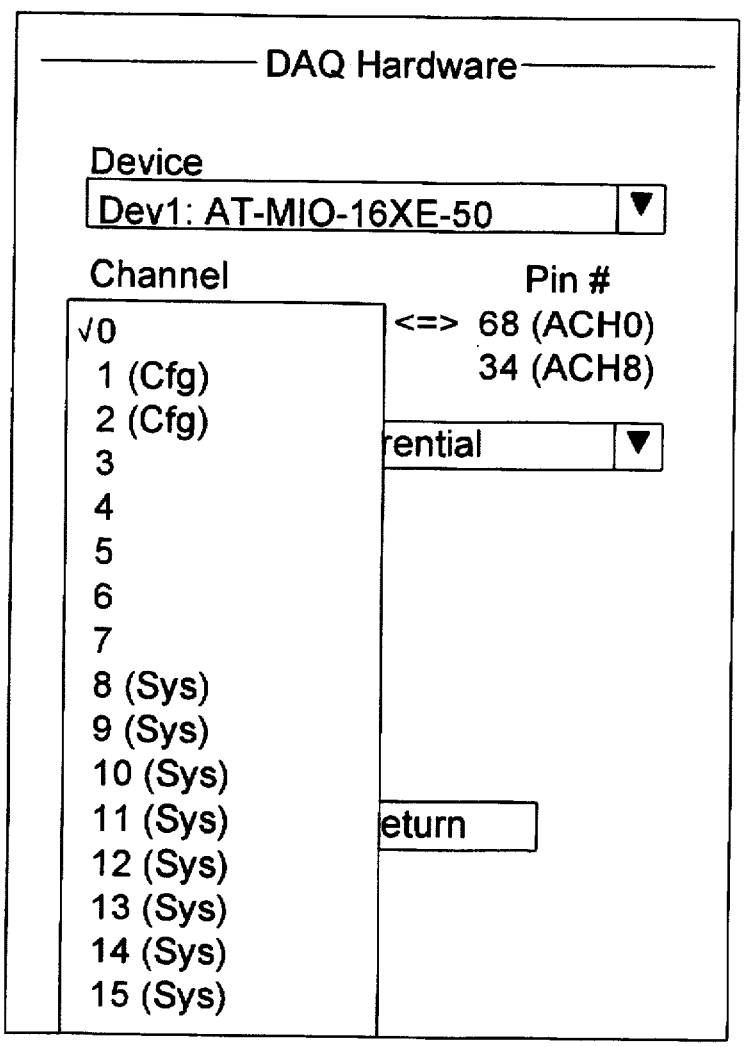
FIG. 17 illustrates the channel menu ring options on the DAQ Hardware panel of the Analog Input Configuration window of FIG. 8.

The DAQ Hardware panel of FIG. 17 shows the Channel menu ring selections. The Channel menu ring changes depending on the device the user has selected. The Channel menu lists all the analog input channels for the DAQ device. Some channels are reserved because they are used by the user's system configuration and therefore are not available for configuration. The Channel menu marks these channels with a (Sys) next to the channel number. The Channel menu also marks channels already used by other channel configurations with a (Cfg). Examples of reserved channel situations were discussed above.

If the user selects channels marked with a (Sys) or a (Cfg), the user's channel configuration is marked as invalid. However, if the user is swapping two channels, this invalid situation is only temporary, and the configuration becomes valid when another configuration no longer is attached to the DAQ Hardware Channel.

After the user selects a device and channel, the DAQ Hardware panel displays the pin number or name corresponding to the selected channel as labeled on the device terminal block, if one is connected, or on the device output connector if no terminal block is connected to the device.

Figure 18:
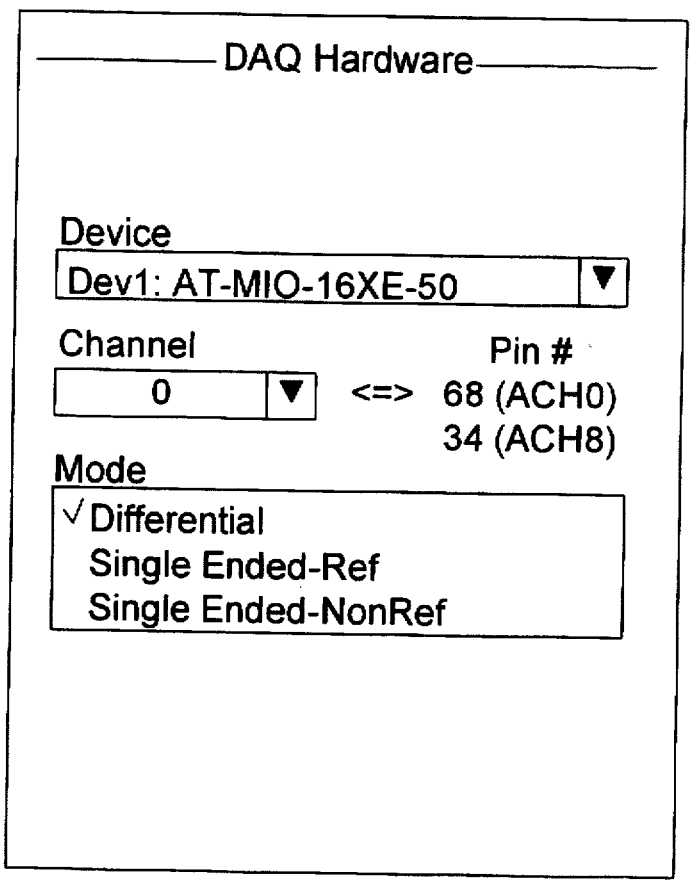
FIG. 18 illustrates the mode options on the DAQ Hardware panel of the Analog Input Configuration window of FIG. 8.

FIG. 18 illustrates a Mode Menu in the DAQ Hardware panel. The Mode menu lists the input modes the user can choose, if the DAQ device the user selects works with channel independent software. The user can choose between differential, single-ended (Ref), or non-reference single-ended (Non-Ref) in the Mode menu. If the input mode selection is only software selectable by board or is hardware jumper programmable, the DAQ Hardware panel displays the mode currently configured as specified in the NI-DAQ Configuration Utility. The user must be sure to correctly set the actual hardware jumpered configuration in the NI-DAQ Configuration Utility. Because the NI-DAQ Configuration Utility automatically selects the factory default for the user's board, the user's configuration should be correct as long as the user has not changed any board jumpers.

FIGS. 19–21 illustrate the DAQ hardware panel for different types of thermocouple selections. FIG. 19 illustrates a DAQ hardware panel for a "built-in" CJC type. FIG. 20 illustrates a DAQ hardware panel for a "user value" CJC type. FIG. 21 illustrates a DAQ hardware panel for a "user supplied" CJC type.

Analog Output Channel Configuration

Figure 23:
FIG. 23 illustrates the Analog Output Configuration window of FIG. 22 for a current actuator.

The DAQ Channel Wizard Channel view is also used to configure an analog output channel. The user presses the New . . . button and selects Analog Outputs or clicks on the row of an existing analog output channel configuration and selects Edit . . . . These actions invoke the Analog Output Configuration dialog box, shown in FIG. 22. FIG. 22 illustrates the Analog Output Configuration dialog box for a voltage output, and FIG. 23 illustrates the Analog Output Configuration dialog box for a current output.

Figures 9A, 9B:
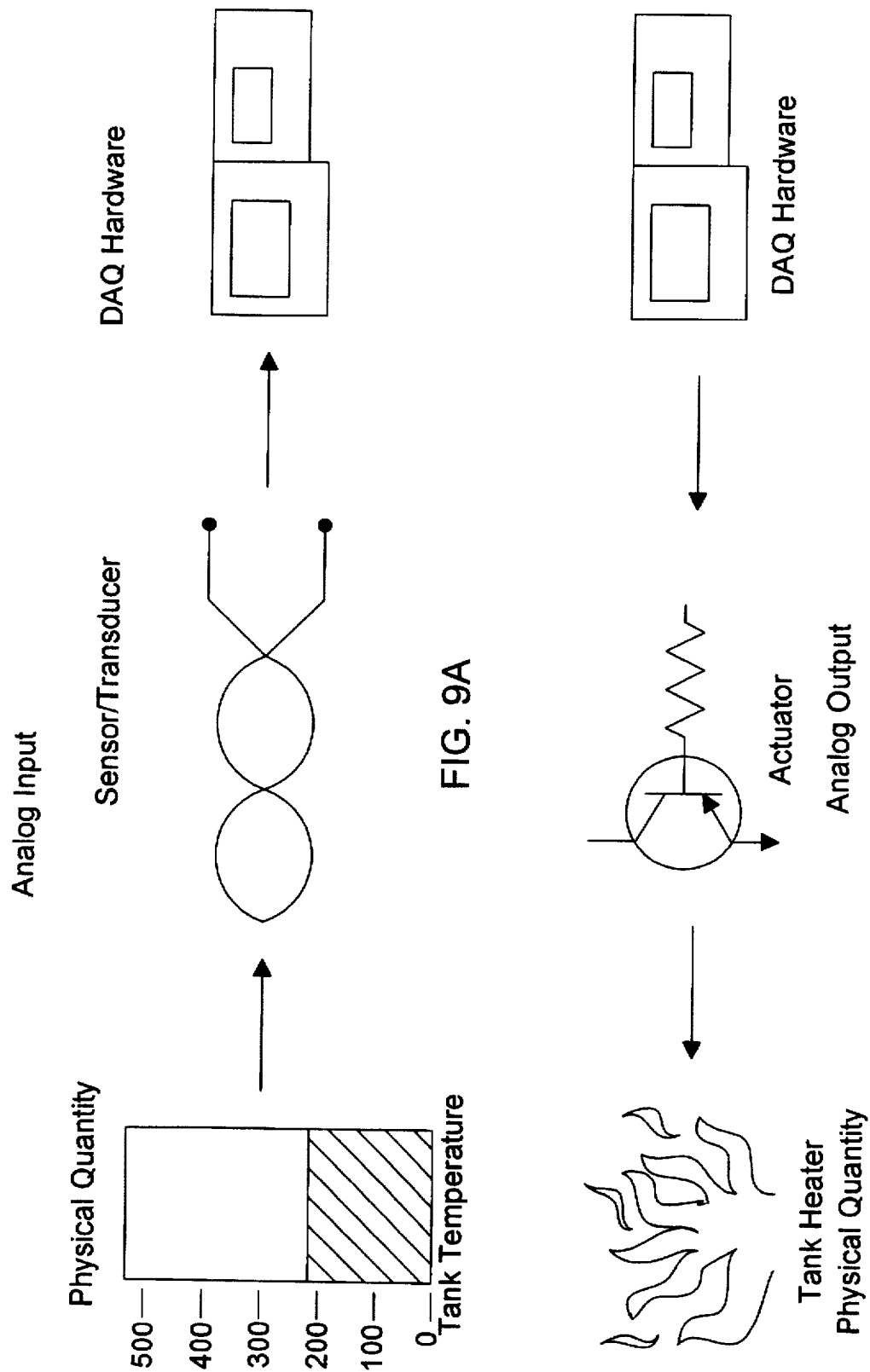
FIG. 9A illustrates an analog input example.
FIG. 9B illustrates an analog output example.

The Analog Output Configuration dialog box is modeled after the analog output channel configuration shown in FIG. 9B, which includes the Physical Quantity, the Actuator, and the DAQ Hardware. In this dialog box, the user assigns or edits a name for the channel configuration. This channel is referred to by the user assigned name until changed by the user. The user can also enter a description for the channel for documentation purposes.

Whenever the user changes the Actuator or DAQ device the user uses to control a specific physical quantity, the user might also need to change other settings in the Actuator and DAQ Hardware panels.

Physical Quantity Panel (Analog Output)

When configuring analog output, the Physical Quantity panel in the Analog Output Configuration dialog box of FIGS. 22 or 23 is used to define the units and range of the physical quantity the user is controlling with a given DAQ device channel. The user also can enable the Coerce to Range option for the channel. When this option is selected, the DAQ software controlling the channel outputs a value within the range, even if the value passed to the DAQ software, in physical engineering units, is out of range. The DAQ software also uses the range to detect an out of range condition.

In addition to the physical units and range, for analog output configurations the user also enters an Initial Value, in physical units, for the analog output channel. The DAQ Channel Wizard sets the analog output channel to this value when the DAQ software is loaded and whenever the DAQ software is shut down. The analog output channel also is initialized to this value when the DAQ software is loaded. The DAQ Channel Wizard cannot configure the power on state for any analog output channels.

FIG. 24—Actuator Panel (Analog Output)

An actuator is a device which translates from the quantity generated by a DAQ analog output channel to the physical quantity being controlled. The Actuator panel in the Analog Output Configuration dialog box of FIGS. 22 or 23 is used to select the actuator type to connect to the DAQ channel. The actuator the user selects gives the user complete control over how the scaling is done to convert from the actuator control to the physical quantity.

The DAQ Channel Wizard actuator options include Voltage Output Channel and Current Output Channel. The actuator options are listed in the actuator panel illustrated in FIG. 24.

1. Voltage Output Channel

As shown in FIG. 22, the user configures a voltage output channel by selecting the Voltage or Voltage (0 to 5V) actuator options, either of which automatically sets the actuator units to V. A voltage actuator converts the voltage output from the DAQ Hardware to the physical quantity the user is controlling. When the user selects the voltage output option, the user only can select the DAQ devices in the system with voltage output channels in the Device menu of the DAQ Hardware panel.

When the user selects the Voltage (0 to 5V) option, the DAQ Channel Wizard automatically sets the actuator range to be 0 to 5V. When the user selects the Voltage option, the user enters the minimum and maximum values for the voltage actuator range. The DAQ Channel Wizard then uses the Scaling Formula selected to convert the physical range the user wants to control to the voltage output of the actuator.

2. Current Output Channel

As shown in FIG. 23, the user configures a current output channel by selecting the Current or Current (4 to 20 mA) actuator options, either of which automatically sets the actuator units to mA. A current actuator converts the current output from the DAQ Hardware to the physical quantity the user is controlling. When the user selects the current output option, the user only can select the DAQ devices in the system with current output channels in the Device menu of the DAQ Hardware panel.

When the user selects the Current (4 to 20 mA) option, the DAQ Channel Wizard automatically sets the actuator range to be 4 to 20 mA. When the user selects the Current option, the user enters the minimum and maximum values for the current actuator range. The DAQ Channel Wizard then uses the Scaling Formula selected to convert the physical range the user wants to control to the current output of the actuator.

The actuator the user selects controls the actuator units displayed for this channel. Some actuator selections also have pre-selected ranges. The actuator range automatically changes to the appropriate range in terms of the actuator units when the user selects one of these actuators.

Figure 25:
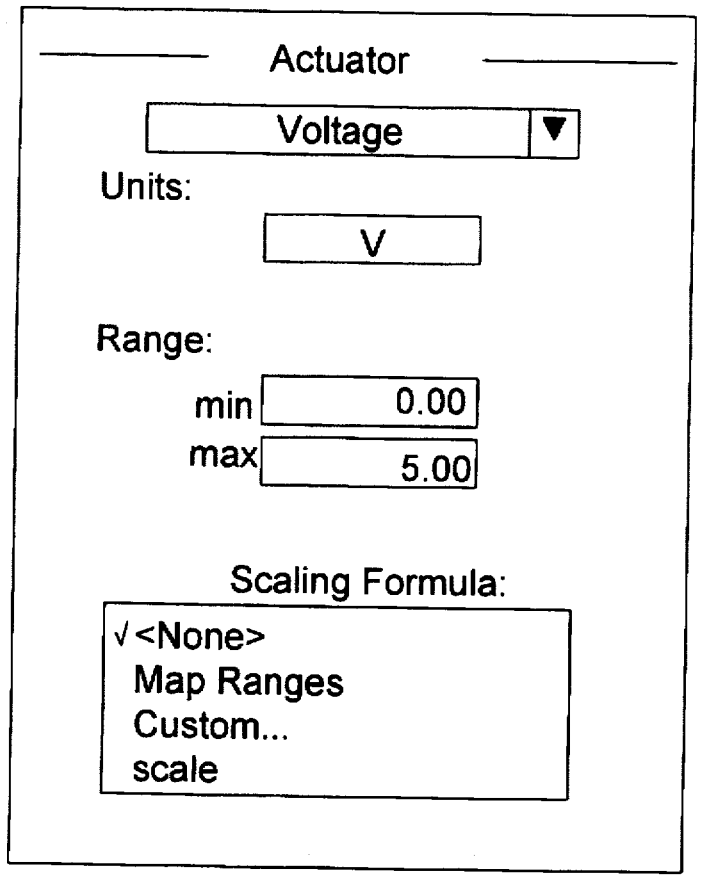
FIG. 25 illustrates the scaling selections on the actuator panel of the Analog Output Configuration window of FIGS. 22 and 23.

Actuator scaling options are illustrated in FIG. 25. The voltage or current output options give the user complete control over how the actuator is scaled.

DAQ Hardware Panel—Analog Output

The DAQ Hardware panel in the Analog Output Configuration dialog box is used to select which DAQ device (DAQ plug-in board, stand-alone DAQ product, or SCXI module) and which channel on the device the user is assigning to this channel configuration. The Device menu lists all devices in the system with analog output channels. The user first selects the DAQ device followed by the channel.

The options on the DAQ Hardware panel change depending on the actuator selected by the user. The DAQ Channel Wizard determines whether the actuator the user selects uses volts or current, and what quantities the user can output with a DAQ device. The selectable devices change depending on the actuator the user selects. If the user selects a voltage actuator, only devices with voltage analog output channels are selectable. If the user selects a current actuator, only devices with current analog output channels are selectable.

Figure 26:
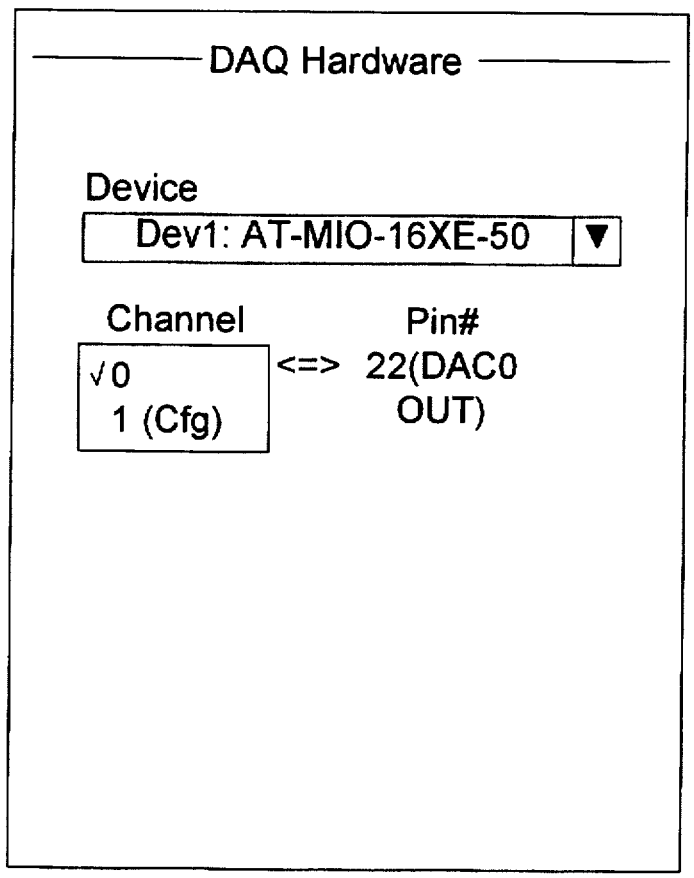
FIG. 26 illustrates the channel selections on the DAQ Hardware panel of the Analog Output Configuration window of FIGS. 22 and 23.
Figure 32:
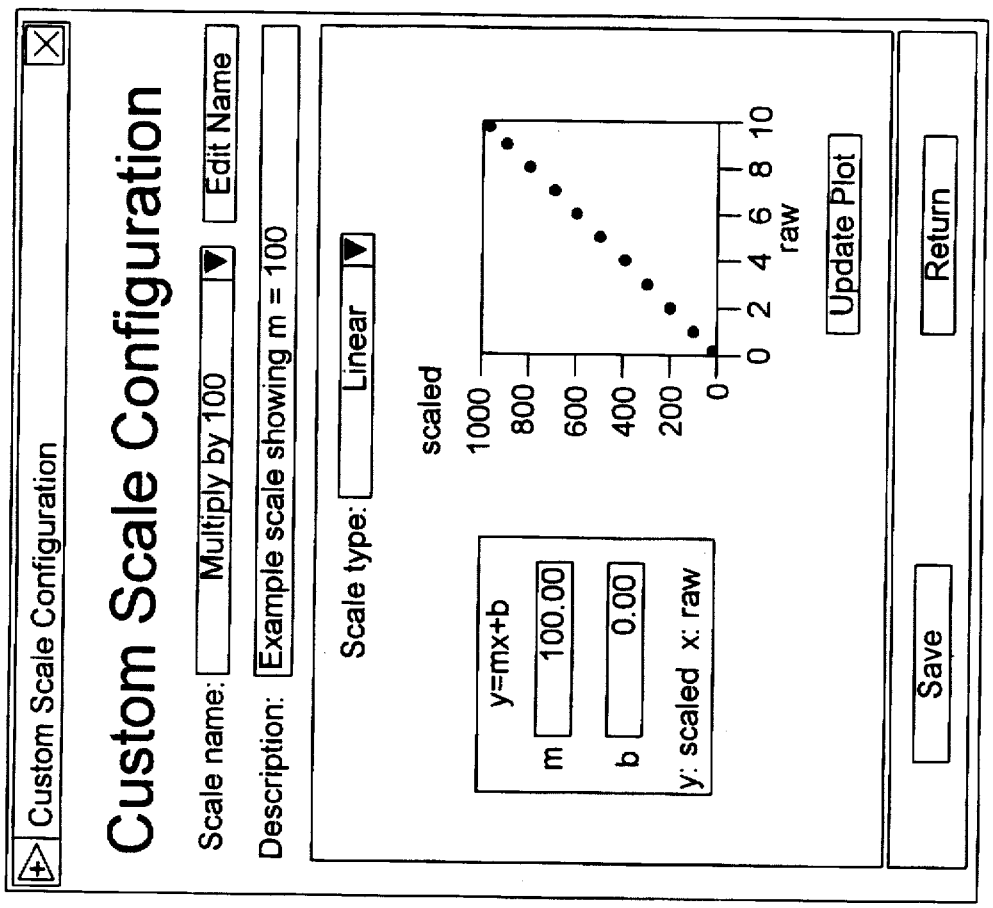

As shown in FIG. 26, the DAQ Hardware panel includes a channel menu ring. The channel menu ring changes depending on the device the user has selected. The channel menu lists all the analog output channels for the DAQ device. The channel menu also marks channels used by other channel configurations with a (Cfg). If the user selects channels marked with a (Cfg), the channel configuration is marked as invalid. However, if the user is swapping two channels, this invalid situation is only temporary, and the configuration becomes valid when another configuration no longer is attached to the DAQ Hardware Channel. After the user selects a device and channel, the DAQ Hardware Panel displays the pin number or name corresponding to the selected channel.

After the user selects a device and channel, the DAQ Hardware panel displays the pin number or name corresponding to the selected channel as labeled on the device terminal block, if one is connected, or on the device output connector if no terminal block is connected to the device.

Digital I/O Channel Configuration

The DAQ Channel Wizard Channel view can also be used to configure a digital I/O channel. To configure a digital I/O channel, the user presses the New . . . button and selects Digital I/O, or clicks on the row of an existing digital I/O channel configuration and selects Edit . . . . These actions invoke the Digital I/O Configuration dialog box, as shown in FIG. 27. Various examples of the Digital I/O Configuration dialog box are shown in FIGS. 27–30.

In this dialog box, the user assigns or edits a name for the channel configuration. This channel always is referred to by the name the user assigns until changed by the user. The user can also enter a description for the channel for documentation purposes. In this dialog box, the user also can configure the following: the type of digital operation; the DAQ Hardware to be used by the Digital Channel; the Initial State for the digital channel (if it is configured for output); and the Invert Signal option for the digital channel.

As shown in FIGS. 27–30, the user can select between four digital types or signal types, these being "read from port", "read from line", "write to port" and "write to line". It is noted that if the user is reading from or writing to a port, the Initial State and Invert Signal? settings change width to match the port width of the selected DAQ device port.

Digital I/O on DAQ devices is organized as one or more digital ports that can be configured for input or output in some cases and are fixed in direction in other cases, depending on the DAQ device capabilities. A digital port is a set of digital bits or lines that can be read or written in a single operation. The number of digital lines making up a port are referred to as the port width. Typical port widths are 4, 8, 16 and 32 lines.

The DAQ Channel Wizard can be used to configure a digital I/O channel to operate on a single line or the entire port. A digital I/O channel is configured as a single line if the user desires to monitor or control the individual lines independently. A digital I/O channel is configured as a port if the user desires to monitor or manipulate multiple lines at the same time.

If the user selects a channel to operate on a port, the user cannot configure the individual lines of that port. Likewise, if the user is configuring individual lines of a certain port, the user cannot select that entire port to be configured as a channel.

Directional control of lines in digital ports varies with different DAQ devices. Some DAQ devices support linewise directional control, while other DAQ devices only support directional control on the entire port. In the latter case, the direction the user selects for a specific line on a port will affect all other lines in that port. Some DAQ devices also have fixed input or output directions for a given port or line.

Digital I/O Hardware Panel

The Hardware panel in the Digital I/O Configuration dialog box of FIGS. 27–30 is used to select which DAQ device (DAQ plug-in board, stand-alone DAQ product, or SCXI module) and which port and line on the device the user is assigning to this channel configuration. The Device menu lists the DAQ devices in the system with digital ports. If the user has selected Read to Line or Write to Line, the user selects a port and a line. If the user has selected Read from Port or Write to Port, the user only selects a port.

The Port menu lists the ports offered on the device. The user selects the port connected to the respective signals. Unidirectional ports are marked by read only or write only following the port name. If the user configures the signal to use a unidirectional port in the wrong direction, the configuration is marked as invalid.

Ports with at least one line already reserved are marked by a (Sys) or a (Cfg) following the port name. A (Sys) denotes that at least one line of the port is reserved by the system. A (Cfg) denotes that at least one line of the port is reserved by another channel configuration. A (N/A) following a port name indicates that port is not available on the device. If the user configures the signal to use a reserved or unavailable port, the configuration is marked as invalid.

FIG. 31 illustrates the line menu of the Hardware panel. For some devices, all lines on the same port must be configured in the same direction. If the user selects a line on a port and other digital channel configurations are using other lines of the same port for the opposite direction, the channel configuration will become invalid if the DAQ device cannot mix directions on the port. When the user selects a device, port, and line, the Hardware panel displays the pin number or name corresponding to the selected line.

If the user is configuring the channel to Read from Line or Write to Line, the Line menu lists all the available lines on the selected Device Port. The Line menu also marks lines already used by the system configuration or other channel configurations with a (Sys) or a (Cfg), respectively. If the user selects lines marked with a (Sys) or a (Cfg), the channel configuration is marked as invalid. However, in the (Cfg) case, if the user is swapping two lines, this situation is only temporary and the configuration becomes valid when another channel configuration no longer is attached to the DAQ Hardware Line.

Initial State Panel—Digital I/O

The Initial State panel is used to enter an initial value for the digital output lines in the selected digital port. This is the initial value before the Invert Signal? option is applied to the output line. The initial value can be inverted according to the Invert Signal? setting before being written to the digital output. The DAQ Channel Wizard sets the digital output line to this value when the DAQ software is loaded and whenever the DAQ software is shut down. The digital output line also is initialized to this value when the DAQ software is loaded. It does not configure the power on state for that digital output line. The DAQ Channel Wizard cannot configure the power on state for any digital output lines.

When the user configures Digital Output ports with 16 or 32 lines (more than 8 lines per port), the Set . . . button appears in the dialog box. This button is pressed to invoke an additional dialog box for setting the Initial State value.

Invert Signal? Panel—Digital I/O

The Invert Signal? panel is used to turn on or off inversion of individual lines in the selected digital port. If the user is reading or writing on a single line, the user can turn inversion on or off for just that line in the port. If the user is reading or writing the entire port, the user can specify inversion on a per line basis. Inversion on a per line basis is a way of scaling the digital port—converting it to a value that is more usable.

Any values read or written to the line or port are inverted according to the Invert Signal? setting before being written or after being read. This includes the Initial State value. The Initial State value must account for this possible inversion.

When the user configures Digital Input and Output ports with 16 or 32 lines (more than 8 lines per port), the Set . . . button appears in the dialog box. This button is pressed to invoke an additional dialog box for setting the Invert Signal? option.

Channel Types—Digital I/O

1. Digital Input Channel-Read from Line

The user configures a digital input channel by line by selecting the Read from Line option, then selecting the device Port and one of the Lines in that port. The Device list displays all devices containing ports for digital I/O. If other lines have been configured as digital output channels on that port but the selected port does not support line-wise directional control, the DAQ Channel Wizard marks the digital channel configuration as invalid until all lines for that port have the same direction.

The user selects No (do not invert) or Yes (invert) as the Invert Signal? option for the digital line. With this type of digital scaling, the user monitors digital lines that use inverted or negative logic (state is TRUE or ON when the line is low) as positive logic.

2. Digital Input Channel-Read from Port

The user configures a digital input channel by port by selecting the Read from Port option, then selecting the device Port. The Device list displays all devices containing ports for digital I/O. The user then can read all bits or lines in the port from the digital channel. The DAQ device the user selects determines the number of lines per port. The user can see the port width as the number of elements in the Initial State and Invert Signal? displays.

The user also can apply inversion to each line in the port. The user selects N (do not invert) or Y (invert) for each line as the Invert Signal? option for the digital line. With this type of digital scaling, the user monitors digital lines that use inverted or negative logic (state is TRUE or ON when the line is low) as positive logic. When the port is read, the value is returned to the user with the selected lines inverted.

When the user configures Digital Input ports with 16 or 32 lines (more than 8 lines per port), the Set . . . button appears in the dialog box. This button is pressed to invoke an additional dialog box for setting the Invert Signal? option.

3. Digital Output Channel-Write to Line

The user configures a digital output channel by line by selecting the Write to Line option, then selecting the device Port and one of the Lines in that port. The Device list displays all devices containing ports for digital I/O. If other lines have been configured as digital input channels on that port but the selected port does not support line-wise directional control, the DAQ Channel Wizard marks the digital channel configuration as invalid until all lines for that port have the same direction.

The user selects High (or 1) or Low (or 0) as the initial output state for the digital output channel. The DAQ Channel Wizard initializes the digital output line to this state when the DAQ software is loaded and when the DAQ software is shut down. The DAQ Channel Wizard does not configure the power on state for that digital output line. The DAQ Channel Wizard cannot configure the power on state for any I/O channels.

The user selects No (do not invert) or Yes (invert) as the Invert Signal? option for the digital line. With this type of digital scaling, the user monitors digital lines that use inverted or negative logic (state is TRUE or ON when the line is low) as positive logic. The Invert Signal? option will be applied to the initial output state prior to being written to the digital line.

4. Digital Output Channel-Write to Port

The user configures a digital output channel by port by selecting the Write to Port option, then selecting the device Port. The Device list displays all devices containing ports for digital I/O. The user then can write all bits or lines in the port together from the digital channel. The DAQ device the user selects determines the number of lines per port. The user can see the port width as the number of elements in the Initial State and Invert Signal? displays.

The user selects H (High or 1) or L (Low or 0) as the initial output state for each line in the selected digital port. The DAQ Channel Wizard initializes the digital output line to this state when the DAQ software is loaded and when the DAQ software is shut down. It does not configure the power on state for that digital output line. The DAQ Channel Wizard cannot configure the power on state for any digital I/O channels.

The user also can apply inversion to each line in the port. The user selects N (do not invert) or Y (invert) for each line as the Invert Signal? option for the digital line. With this type of digital scaling, the user outputs digital lines that use inverted or negative logic (state is TRUE or ON when the line is low) as positive logic. The Invert Signal? option will be applied to the initial output state prior to being Written to the digital port.

When the user configures Digital Output ports with 16 or 32 lines (more than 8 lines per port), the Set . . . button appears in the dialog box. This button is pressed to invoke an additional dialog box for setting the Initial State value and the Invert Signal? option.

Customized Scaling for Analog Channels

The user customizes scaling for an analog channel by selecting Custom . . . from the Scaling Formula menu in the Analog Input or Analog Output Configuration dialog boxes. The user also can click on the View Scale button when the user has a custom scale selected in either of those dialog boxes. In addition, the user can customize scaling by pressing the New . . . button on the DAQ Channel Wizard, Scales view or by clicking on a row for an existing custom scale and selecting Edit . . . . These actions invoke the Custom Scale Configuration dialog box, shown in FIG. 32. The custom scale options include Linear, Table, Polynomial, and Expression scale types, as shown in FIGS. 32–35, respectively.

For a linear scale, the user automatically selects linear scale coefficients when the user chooses Map Ranges as a scale type in the Analog Input or Analog) Output Configuration dialog boxes. The user also can set these coefficients by selecting Linear scale type in the Custom Scale Configuration dialog box.

To configure a linear scale, the user enters the m and b coefficients for the formula $$y = mx + b$$

where x is the raw value read from the sensor or output to the actuator in sensor or actuator units and y is the physical quantity engineering value.

For analog input, the user scales from raw values to engineering values when measuring the sensor. For analog output, the user scales from engineering values raw values with the formula $$x = (y - b)/m$$

Table scale type is selected in the Custom Scale Configuration dialog box to configure a scale based on a lookup table. As shown in FIG. 33, this dialog box displays a Table Values control. The user can enter the raw and scaled (engineering unit) value pairs in the Table Values control. The user uses this table to scale both from raw sensor value to physical quantity for analog input and physical quantity to raw actuator value for analog output. The user also can set the raw sensor measurement range for analog input.

A lookup table works by performing linear interpolation between the raw and scaled value pairs. No linear interpolation is done beyond the maximum and minimum table values, so the lookup table should be greater than or equal to the raw and scaled (physical) ranges of the channel being scaled. For example, the table shown below will not give the user scaled values below 0 or above 100.

In addition to entering the values for the lookup table manually, the user can import them from a tab- or comma-delimited spreadsheet file. To import the table values from a file, press the File . . . button and select the text file containing the table lookup values. This invokes the Open Text File dialog box.

Figure 34:
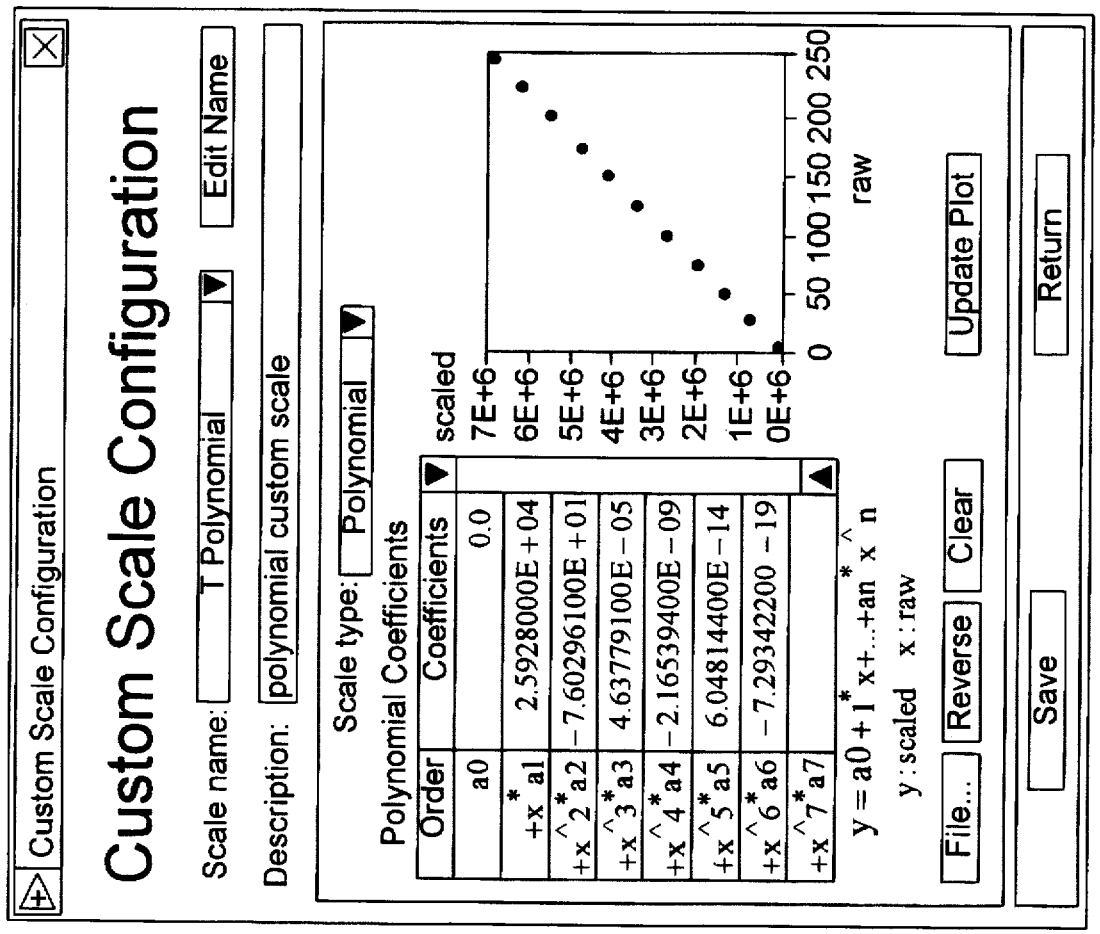

Polynomial scale type is selected in the Custom Scale Configuration dialog box to configure a scale based on a polynomial expression. As shown in FIG. 34, this dialog box displays a Polynomial Coefficients control. The Polynomial scale displays controls for both the forward polynomial (used to scale from the raw sensor units to the physical engineering unit) and the reverse polynomial (used to scale from the physical engineering unit to the raw sensor units). The user can enter coefficients for each polynomial in the respective input control. The Reverse button is used to toggle between the two views. The user provides a polynomial for each direction to properly scale the channel.

In addition to entering the values for the polynomial coefficients manually, the user can import them from a tab- or comma-delimited spreadsheet file. To import the coefficient values from a file, the user selects the forward or reverse polynomial. The user then presses the File . . . button and selects the text file containing the coefficient values. This invokes the Open Text File dialog box.

Figure 35:
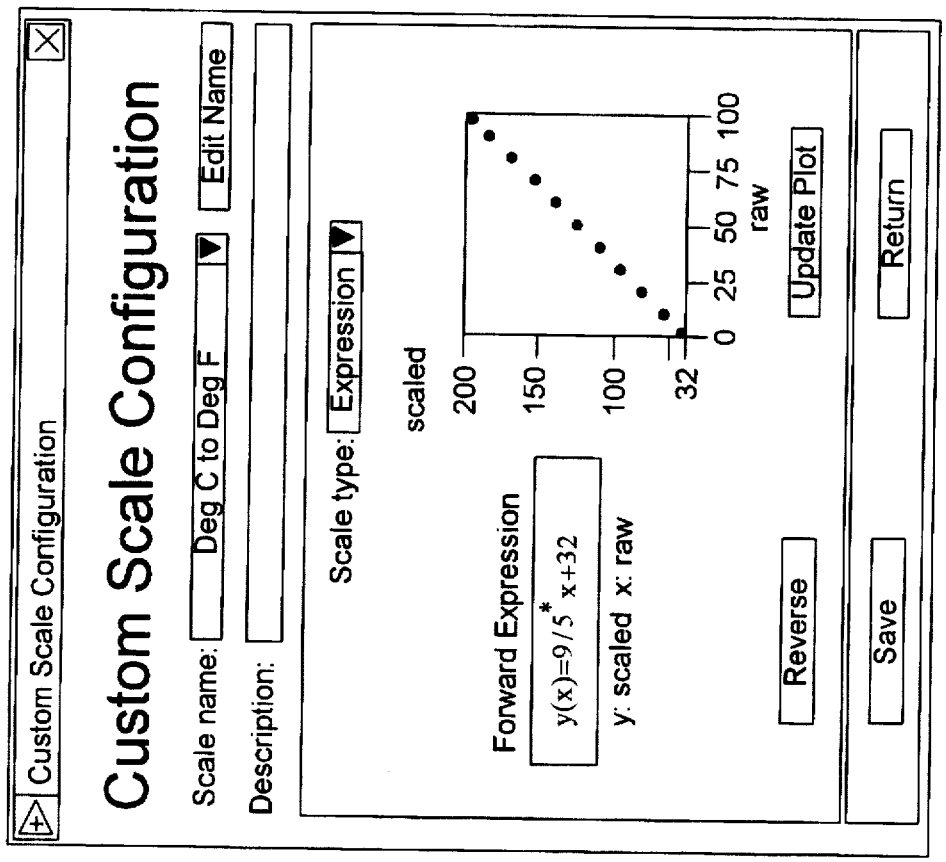

Expression scale type is selected in the Custom Scale Configuration dialog box to configure a scale based on an expression. As shown in FIG. 35, this dialog box displays an Expression control. The Expression scale displays controls for both the forward expression (used to scale from the raw sensor units to the physical engineering unit) and the reverse expression (used to scale from the physical engineering unit to the raw sensor units). The user can enter a formula for each expression in the respective input. This formula must be entered in terms of x and y, where x is the raw sensor unit and y is the scaled physical unit. The Reverse button is used to toggle between the two expressions. The user provides an expression for each direction to properly scale the channel.

DAQ Live Monitor

The DAQ Live Monitor is used to view actual readings or to directly control the different configured channels. To access the DAQ Live Monitor, the user selects a channel in the DAQ Channel Wizard Channels view and presses the Go Live . . . button. From here, the user can select and view the following types of channels:

1. Analog Input

Figure 36:
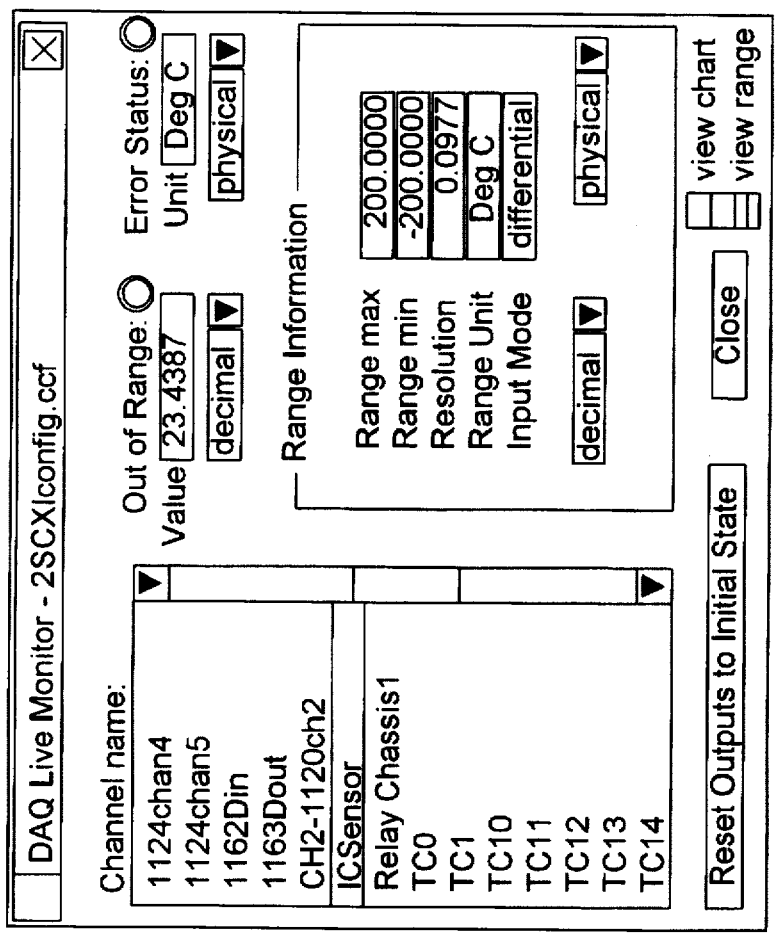
FIGS. 36–37 illustrate the DAQ Live Monitor window.

As shown in FIG. 36, for analog input channels the DAQ Live Monitor Analog Input range view displays the actual values as well as the range and resolution at each stage in the scaling process. The Range Information panel displays the actual range based on the actual hardware settings. This can differ slightly from the channel configuration because the DAQ device the user is using might have different capabilities from the preferred channel configuration. NI-DAQ driver software sets the range on the hardware to the best setting for the hardware, given the desired range setting. For analog input channels, the user can view the values by range or chart.

2. Analog Output

Figure 37:
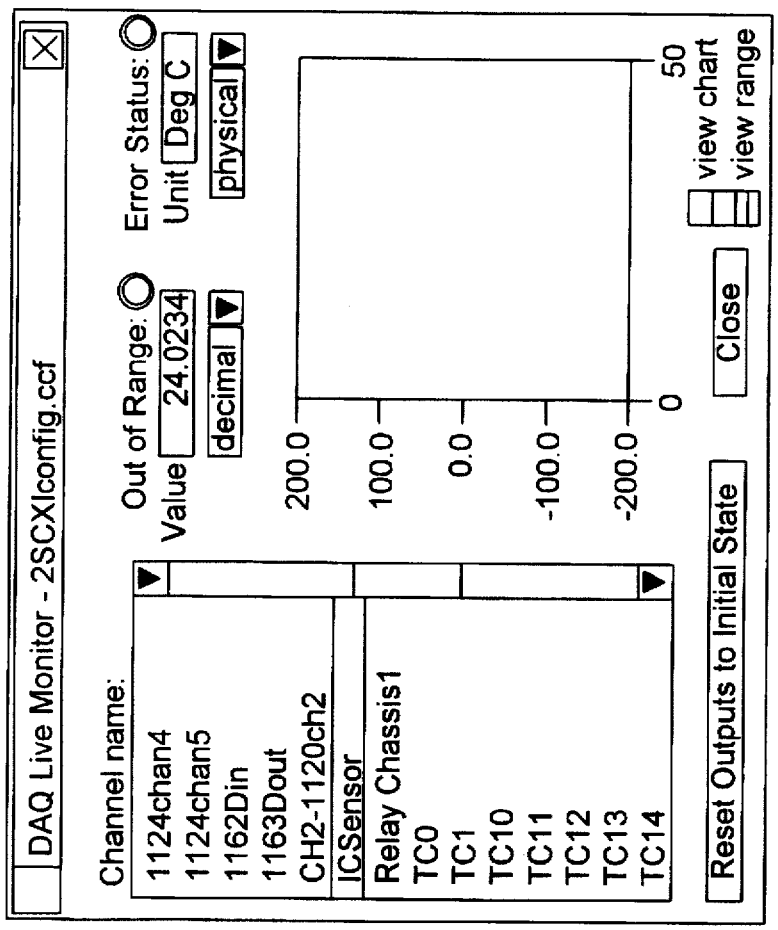

As shown in FIG. 37, for analog output channels, the user control the analog output level by entering the value, in physical units only, into the Value control on the DAQ Live Monitor. The user can view the range information for the selected analog output channel in terms of the range location.

3. Digital Input

For digital input channels, the DAQ Live Monitor displays the state of all the digital input lines for that channel. The digital input indicator changes depending on the number of lines in the digital channel the user has selected. If the channel is configured as digital line input, the user only views the one line. If the channel is configured as a digital port, the user views each of the lines making up the port. The ports are shown least significant (low-order) line (bit) first.

4. Digital Output

For digital output channels, the user controls the digital output displayed on the DAQ Live Monitor. The digital output control changes depending on the number of lines in the digital channel the user has selected. If the channel is configured as digital line output, the user only control the one line. If the channel is configured as a digital port, the user controls each of the lines making up the port. The ports are shown least significant (low-order) line (bit) first.

Correcting an Invalid Channel Configuration

The DAQ Channel Wizard marks a channel invalid when it cannot correctly configure the channel. Channels with invalid configurations display the word "Bad" in the left-hand column of the DAQ Channel Wizard Channels view. Channels with invalid configurations also display Configuration Invalid! at the bottom of the channel configuration edit screen. The channel configuration is monitored for validity as the user edits it.

A channel configuration can become invalid because of the following reasons.

1) The DAQ device channel selected is reserved for the system (Sys) or is already assigned to another channel configuration (Cfg). In this case, (Sys) or (Cfg) is displayed next to the channel number in the DAQ Hardware panel. Channels marked with (Sys) or (Cfg) should not be chosen unless it is temporary, such as when the user is planning to change another channel configuration to make the selected channel available.

2) The user has changed a DAQ device in the system and the DAQ Channel Wizard has attempted to convert the channel configuration to the new device. Channel configurations not successfully converted are not deleted, but are marked as invalid. It might be that the hardware channel the user had originally chosen is no longer available, or the new device does not allow some of the options the user had chosen for the previous device.

3) The DAQ device corresponding to the channel is no longer in the system.

4) One or more of the menu selections in the DAQ Hardware panel is marked with N/A. If a menu item entry is marked N/A, the selection is not available for the selected DAQ device and thus it is not a valid choice. This occurs if the user changes or removes a device in the system.

5) The user has connected a terminal block or SCXI system to the DAQ device. In this case, the channel might not be able to connect to an external signal because it is used by the SCXI system or terminal block.

When the user edits the channel configuration, any of the above invalid conditions may occur. Once the channel configuration is valid, the Configuration Invalid! message disappears.

The user also can keep the DAQ Live Monitor open while the user is editing channel configurations. The DAQ Live Monitor automatically updates when the user changes and saves a channel configuration.

The DAQ Live Monitor is a useful diagnostic tool. The DAQ Live Monitor displays the best settings, as calculated by the NI-DAQ driver, for the hardware measuring each channel, one channel at a time. However, these actual settings can change when more than one channel is monitored at the same time. This can happen when the user is monitoring multiple channels with widely varying ranges on the same board or SCXI device. In this case, the SCXI board or device can be set to the largest range of all the channels for that device. The user should not mix channels that require widely varying range settings. For example, if the user is using an SCXI-1200 or Lab-PC+ with a SCXI-1100 module, all channels will be set to the same range.

Changing the DAQ Devices in a System

When the user changes the DAQ devices in the system and then opens a channel configuration file that was configured for the old system, the DAQ Channel Wizard detects the changed devices and attempts to convert the channel configuration file. If the user adds new plug-in boards or DAQPad devices to the system, the DAQ Channel Wizard only prompts the user for additional terminal block information if needed.

If the user changes the DAQ device the user is using, such as when the user takes a channel configuration file over to a new system, the DAQ Channel Wizard attempts to reassign the channels to the new DAQ device. It does not delete any of the named channel configurations, but rather marks them as invalid if it cannot successfully reassign them. The DAQ Channel Wizard brings up the Device Warning dialog box to alert the user of the situation, displaying the conversion it will attempt. The user can choose to proceed or exit the DAQ Channel Wizard.

Once the user completes the conversion, the DAQ Channel Wizard marks any channel configurations that cannot be converted to the new device as "Bad". The user edits the "Bad" configurations to make them valid, or deletes the channel configurations. In most cases, all the user need to do is change the DAQ device or channel associated with each named channel configuration.

If the user attaches an SCXI system to a plug-in board that did not previously have SCXI attached, some on-board channels are no longer available. The DAQ Channel Wizard does not attempt to reassign these channels, but instead marks any configurations using these channels as invalid.

The user should avoid changing the device numbers of devices in the system because this invalidates the channel configurations using that device. If the user switches device numbers, the user needs to go through each channel configuration and change the device selection.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for configuring one or more channels on a data acquisition device in a data acquisition system, the method comprising:
   receiving at least one channel configuration specification from a user, wherein said receiving at least one channel configuration specification comprises:
   receiving and storing input from a user regarding units and range of a physical quantity being measured/generated;
   receiving and storing input from a user regarding how the physical quantity is being converted to units which can be measured/generated by a data acquisition device;
   receiving and storing input from a user regarding a selected channel of a data acquisition device;
   wherein said at least one channel configuration comprises the units and range of the physical quantity being measured/generated and how the physical quantity is being measured/generated for the selected channel of the data acquisition device;

assigning a name to said at least one channel configuration;

constructing a program in response to user input which controls the data acquisition system, wherein said constructing includes receiving the assigned name which specifies the channel configuration for the selected channel of the data acquisition device;

executing the program to perform a data acquisition operation, wherein said executing includes using the channel configuration referenced by the assigned name in performing said data acquisition operation.

2. The method of claim 1, wherein said constructing the program does not require the user to create code to specify the channel configuration.

3. The method of claim 1, wherein said executing includes operating in units of the physical quantity being measured/generated according to the channel configuration;
   wherein said constructing the program does not require the user to create code to operate in the units of the physical quantity being measured/generated.

4. The method of claim 1, wherein the selected channel is an analog input channel, wherein said executing includes returning data in units of the physical quantity being measured according to the channel configuration;
   wherein said constructing the program does not require the user to create code to return data in the units of the physical quantity being measured.

5. The method of claim 1, wherein the selected channel is an analog output channel, wherein said executing includes generating data in units of the physical phenomenon of interest according to the channel configuration;
   wherein said constructing the program does not require the user to create code to generate data in the units of the physical quantity being measured.

6. The method of claim 1, further comprising:
   displaying on the screen a physical quantity panel, wherein the physical quantity panel includes input fields for units and range of a physical quantity being measured/generated;
   wherein said input from a user regarding what units and range are being measured/generated is received in response to said displaying on the screen said physical quantity panel.

7. The method of claim 1, further comprising:
   displaying on the screen a sensor panel, wherein the sensor panel includes an input field for selecting a sensor type to connect to the selected channel;
   wherein said receiving and storing input from a user regarding how the physical quantity is being converted to units which can be measured/generated comprises receiving a selected sensor type to connect to the selected channel of the data acquisition device.

8. The method of claim 7, further comprising:
   wherein said receiving and storing input from a user regarding how the physical quantity is being converted to units which can be measured comprises receiving a scaling selection option for said selected sensor type.

9. The method of claim 1, further comprising:
displaying on the screen an actuator panel, wherein the actuator panel includes an input field for selecting an actuator type to connect to the selected channel;
wherein said receiving and storing input from a user regarding how the physical quantity is being converted to units which can be measured/generated comprises receiving a selected actuator type to connect to the selected channel of the data acquisition device.

10. The method of claim 1, further comprising:
displaying on the screen a DAQ Hardware panel, wherein the DAQ Hardware panel includes an input field for selecting a DAQ device and an input field for selecting a channel on the DAQ device that is to be assigned the channel configuration;
wherein said receiving and storing input from a user regarding a selected channel of a data acquisition device is performed in response to said displaying on the screen said DAQ Hardware panel.

11. The method of claim 1, wherein said constructing the program comprises constructing a graphical program.

12. The method of claim 11, wherein said constructing the graphical program comprises connecting the assigned name to a node of the graphical program.

13. A method for configuring one or more channels on a data acquisition device in a data acquisition system, the method comprising:
receiving at least one channel configuration specification from a user, wherein said receiving at least one channel configuration specification comprises:
receiving and storing input from a user regarding what units and range of a physical quantity are being measured;
receiving and storing input from a user regarding how the physical quantity is being converted to units which can be measured;
receiving and storing input from a user regarding a selected channel of a data acquisition device;
wherein said at least one channel configuration comprises the units and range being measured and how the physical quantity is being measured for the selected channel of the data acquisition device;
assigning a name to said at least one channel configuration;
constructing a program in response to user input which controls the data acquisition system, wherein said constructing includes receiving the assigned name which specifies the channel configuration for the selected channel of the data acquisition device;
executing the program to perform a data acquisition operation, wherein said executing includes using the channel configuration referenced by the assigned name in performing said data acquisition operation.

14. The method of claim 13, wherein said constructing the program does not require the user to create code to specify the channel configuration.

15. The method of claim 13, wherein said executing includes operating in units of the physical quantity being measured according to the channel configuration;
wherein said constructing the program does not require the user to create code to operate in the units of the physical quantity being measured.

16. The method of claim 15, wherein the selected channel is an analog input channel, wherein said executing includes returning data in units of the physical phenomenon being measured according to the channel configuration.

17. The method of claim 13, further comprising:
displaying on the screen a physical quantity panel, wherein the physical quantity panel includes input fields for units and range of a physical quantity being measured;
wherein said input from a user regarding what units and range are being measured is received in response to said displaying on the screen said physical quantity panel.

18. The method of claim 13, further comprising:
displaying on the screen a sensor panel, wherein the sensor panel includes an input field for selecting a sensor type to connect to a DAQ channel;
wherein said receiving and storing input from a user regarding how the physical quantity is being converted to units which can be measured comprises receiving a selected sensor type to connect to the selected channel of the data acquisition device.

19. The method of claim 18, further comprising:
wherein said receiving and storing input from a user regarding how the physical quantity is being converted to units which can be measured comprises receiving a scaling selection option for said selected sensor type.

20. The method of claim 13, further comprising:
displaying on the screen a DAQ Hardware panel, wherein the DAQ Hardware panel includes an input field for selecting a DAQ device and an input field for selecting a channel on the DAQ device that is to be assigned the channel configuration;
wherein said receiving and storing input from a user regarding a selected channel of a data acquisition device is performed in response to said displaying on the screen said DAQ Hardware panel.

21. The method of claim 13, wherein said constructing the program comprises constructing a graphical program.

22. The method of claim 21, wherein said constructing the graphical program comprises connecting the assigned name to a node of the graphical program.

23. A method for configuring one or more channels on a data acquisition device in a data acquisition system, the method comprising:
receiving at least one channel configuration specification from a user, wherein said receiving at least one channel configuration specification comprises:
receiving and storing input from a user regarding what units and range of a physical quantity are being generated;
receiving and storing input from a user regarding how the physical quantity is being converted to units which can be generated;
receiving and storing input from a user regarding a selected channel of a data acquisition device;
wherein said at least one channel configuration comprises the units and range being measured and how the physical quantity is being measured for the selected channel of the data acquisition device;
assigning a name to said at least one channel configuration;
constructing a program in response to user input which controls the data acquisition system, wherein said constructing includes receiving the assigned name which specifies the channel configuration for the selected channel of the data acquisition device;

executing the program to perform a data acquisition operation, wherein said executing includes using the channel configuration referenced by the assigned name in performing said data acquisition operation.

24. The method of claim 23, wherein said constructing the program does not require the user to create code to specify the channel configuration.

25. The method of claim 23, wherein said executing includes operating in units of the physical phenomenon being measured according to the channel configuration.

26. The method of claim 23, wherein the selected channel is an analog output channel, wherein said executing includes generating data in units of the physical phenomenon of interest according to the channel configuration.

27. The method of claim 23, further comprising:
displaying on the screen a physical quantity panel, wherein the physical quantity panel includes input fields for units and range of a physical quantity being generated;
wherein said input from a user regarding what units and range are being generated is received in response to said displaying on the screen said physical quantity panel.

28. The method of claim 23, further comprising:
displaying on the screen an actuator panel, wherein the actuator panel includes an input field for selecting an actuator type to connect to the selected channel;
wherein said receiving and storing input from a user regarding how the physical quantity is being converted to units which can be generated comprises receiving a selected actuator type to connect to the selected channel of the data acquisition device.

29. The method of claim 23, further comprising:
displaying on the screen a DAQ Hardware panel, wherein the DAQ Hardware panel includes an input field for selecting a DAQ device and an input field for selecting a channel on the DAQ device that is to be assigned the channel configuration;
wherein said receiving and storing input from a user regarding a selected channel of a data acquisition device is performed in response to said displaying on the screen said DAQ Hardware panel.

30. The method of claim 23, wherein said constructing the program comprises constructing a graphical program.

31. The method of claim 30, wherein said constructing the graphical program comprises connecting the assigned name to a node of the graphical program.

32. A method for configuring one or more channels on a data acquisition device in a data acquisition system, wherein the method configures the one or more channels for digital input/output (I/O), the method comprising:
receiving at least one channel configuration specification from a user, wherein said receiving at least one channel configuration specification comprises:
receiving and storing input from a user regarding a signal type that is being acquired/generated;
receiving and storing input from a user regarding a selected port/line of a data acquisition device;
wherein said at least one channel configuration comprises the signal type and the selected port/line of the data acquisition device;
assigning a name to said at least one channel configuration;
constructing a program in response to user input which controls the data acquisition system, wherein said constructing includes receiving the assigned name which specifies the channel configuration for the selected channel of the data acquisition device;
executing the program to perform a data acquisition operation, wherein said executing includes using the channel configuration referenced by the assigned name in performing said data acquisition operation.

33. The method of claim 32, wherein said receiving and storing input from a user regarding said signal type comprises receiving input regarding whether a read or write is desired.

34. The method of claim 32, wherein said receiving and storing input from a user regarding said signal type comprises receiving a selection from one or more of read from port, read from line, write to port, or write to line.

35. The method of claim 32, wherein said constructing the program does not require the user to create code to specify the channel configuration.

36. The method of claim 32, further comprising:
displaying on the screen a DAQ Hardware panel, wherein the DAQ Hardware panel includes an input field for selecting a DAQ device and an input field for selecting a port and/or line on the DAQ device that is to be assigned the channel configuration;
wherein said receiving and storing input from a user regarding a selected port/line of a data acquisition device is performed in response to said displaying on the screen said DAQ Hardware panel.

37. The method of claim 32, further comprising:
displaying on the screen an initial state panel, wherein the initial state panel includes an input field for selecting an initial value of one or more digital output lines in a selected digital port;
wherein said receiving at least one channel configuration specification from a user comprises receiving and storing input from a user regarding an initial value of one or more digital output lines in a selected digital port.

38. The method of claim 32, further comprising:
displaying on the screen an invert signal panel, wherein the invert signal panel includes an input field for selecting an option to invert a state of one or more digital output lines in a selected digital port;
wherein said receiving at least one channel configuration specification from a user comprises receiving and storing input from a user regarding whether said invert signal option is selected.

39. A data acquisition system, comprising:
a data acquisition device for performing data acquisition operations, wherein the data acquisition device includes one or more channels;
a computer system coupled to the data acquisition device, wherein the computer system includes a CPU and memory
wherein the memory stores at least one channel configuration which specifies a configuration of at least one channel of said data acquisition device, wherein said memory further stores a channel configuration name which corresponds to said configuration of said at least one channel;
wherein the memory further stores a program which controls the data acquisition system, wherein said program receives the channel configuration name and specifies the channel configuration for the at least one channel of the data acquisition device;
wherein the program is executable to perform a data acquisition operation, wherein the program uses the channel configuration referenced by the channel configuration name in performing said data acquisition operation.

40. The data acquisition system of claim 39, wherein said at least one channel configuration comprises units and range of a physical quantity being measured/generated and how the physical quantity is being converted to units which can be measured/generated for a selected channel of the data acquisition device.

41. The data acquisition system of claim 39, wherein said program does not include code to specify the channel configuration.

42. The data acquisition system of claim 41, wherein said program comprises a graphical program, wherein said graphical program includes the channel configuration name connected to a node of the graphical program.

43. The data acquisition system of claim 39, further comprising:
   a sensor coupled to the at least one channel configuration;
   wherein the at least one channel configuration includes a selected sensor type to connect to the at least one channel of the data acquisition device.

44. The data acquisition system of claim 39, further comprising:
   an actuator coupled to the at least one channel configuration;
   wherein the at least one channel configuration includes a selected actuator type to connect to the at least one channel of the data acquisition device.

45. A computer-readable storage media for operating in a computer system, the computer system including a data acquisition (DAQ) device having at least one channel, wherein the storage media stores data, the storage media comprising:
   instructions for receiving at least one channel configuration specification from a user, said instructions including instructions for:
      receiving and storing input from a user regarding units and range of a physical quantity being measured/generated;
      receiving and storing input from a user regarding how the physical quantity is being converted to units which can be measured/generated;
      receiving and storing input from a user regarding a selected channel of a data acquisition device; and
   instructions for assigning a name to said at least one channel configuration;
   wherein said assigned name is usable in a data acquisition program to assign said at least one channel configuration to said selected channel of said DAQ device.

46. A computer-readable storage media for operating in a computer system, the computer system including a data acquisition (DAQ) device having at least one channel, wherein the storage media stores data, the storage media comprising:
   instructions for receiving at least one channel configuration specification from a user, said instructions including instructions for:
      receiving and storing input from a user regarding a signal type that is being acquired/generated;
      receiving and storing input from a user regarding a selected port/line of a data acquisition device; and
   instructions for assigning a name to said at least one channel configuration;
   wherein said assigned name is usable in a data acquisition program to assign said at least one channel configuration to said selected channel of said DAQ device.

47. A method for configuring one or more channels on a data acquisition device in a data acquisition system, the method comprising:
   receiving at least one channel configuration specification from a user, wherein said receiving at least one channel configuration specification comprises:
      receiving and storing input from a user regarding units and range of a physical quantity being measured/generated;
      receiving and storing input from a user regarding how the physical quantity is being converted to units which can be measured/generated;
      receiving and storing input from a user regarding a selected channel of a data acquisition device;
      wherein said at least one channel configuration comprises the units and range of the physical quantity being measured/generated and how the physical quantity is being converted to units which can be measured/generated for the selected channel of the data acquisition device; and
   assigning a name to said at least one channel configuration;
   wherein said assigned name is usable in a data acquisition program to assign said at least one channel configuration to said selected channel of said DAQ device.

48. The method of claim 47, further comprising:
   displaying on the screen a physical quantity panel, wherein the physical quantity panel includes input fields for units and range of a physical quantity being measured/generated;
   wherein said input from a user regarding what units and range are being measured/generated is received in response to said displaying on the displaying on the screen said physical quantity panel.

49. The method of claim 47, further comprising:
   displaying on the screen a sensor panel, wherein the sensor panel includes an input field for selecting a sensor type to connect to the selected channel;
   wherein said receiving and storing input from a user regarding how the physical quantity is being converted to units which can be measured/generated comprises receiving a selected sensor type to connect to the selected channel of the data acquisition device.

50. The method of claim 49, further comprising:
   wherein said receiving and storing input from a user regarding how the physical quantity is being converted to units which can be measured comprises receiving a scaling selection option for said selected sensor type.

51. The method of claim 47, further comprising:
   displaying on the screen an actuator panel, wherein the actuator panel includes an input field for selecting an actuator type to connect to the selected channel;
   wherein said receiving and storing input from a user regarding how the physical quantity is being converted to units which can be measured/generated comprises receiving a selected actuator type to connect to the selected channel of the data acquisition device.

52. The method of claim 47, further comprising:
   displaying on the screen a DAQ Hardware panel, wherein the DAQ Hardware panel includes an input field for selecting a DAQ device and an input field for selecting a channel on the DAQ device that is to be assigned the channel configuration;
   wherein said receiving and storing input from a user regarding a selected channel of a data acquisition device is performed in response to said displaying on the screen said DAQ Hardware panel.

53. A method for configuring one or more channels on a data acquisition device in a data acquisition system, wherein the method configures the one or more channels for digital input/output (I/O), the method comprising:

receiving at least one channel configuration specification from a user, wherein said receiving at least one channel configuration specification comprises:

receiving and storing input from a user regarding a signal type that is being acquired/generated;

receiving and storing input from a user regarding a selected port/line of a data acquisition device;

wherein said at least one channel configuration comprises the signal type and the selected port/line of the data acquisition device; and assigning a name to said at least one channel configuration;

wherein said assigned name is usable in a data acquisition program to assign said at least one channel configuration to said selected channel of said DAQ device.

54. The method of claim 53, wherein said receiving and storing input from a user regarding said signal type comprises receiving input regarding whether a read or write is desired.

55. The method of claim 53, wherein said receiving and storing input from a user regarding said signal type comprises receiving a selection from one or more of read from port, read from line, write to port, or write to line.

56. The method of claim 53, further comprising:

displaying on the screen a DAQ Hardware panel, wherein the DAQ Hardware panel includes an input field for selecting a DAQ device and an input field for selecting a port and/or line on the DAQ device that is to be assigned the channel configuration;

wherein said receiving and storing input from a user regarding a selected port/line of a data acquisition device is performed in response to said displaying on the screen said DAQ Hardware panel.

57. The method of claim 53, further comprising:

displaying on the screen an initial state panel, wherein the initial state panel includes an input field for selecting an initial value of one or more digital output lines in a selected digital port;

wherein said receiving at least one channel configuration specification from a user comprises receiving and storing input from a user regarding an initial value of one or more digital output lines in a selected digital port.

58. The method of claim 53, further comprising:

displaying on the screen an invert signal panel, wherein the invert signal panel includes an input field for selecting an option to invert a state of one or more digital output lines in a selected digital port;

wherein said receiving at least one channel configuration specification from a user comprises receiving and storing input from a user regarding whether said invert signal option is selected.

59. A method for configuring one or more channels on a data acquisition device in a data acquisition system, the method comprising:

receiving at least one channel configuration specification from a user;

assigning a name to said at least one channel configuration;

constructing a program in response to user input which controls the data acquisition system, wherein said constructing includes receiving the assigned name which specifies the channel configuration for the selected channel of the data acquisition device;

executing the program to perform a data acquisition operation, wherein said executing includes using the channel configuration referenced by the assigned name in performing said data acquisition operation.

60. The method of claim 59, wherein said constructing the program does not require the user to create code to specify the channel configuration.

61. The method of claim 59, wherein said executing includes operating in units of the physical quantity being measured/generated according to the channel configuration;

wherein said constructing the program does not require the user to create code to operate in the units of the physical quantity being measured/generated.

62. The method of claim 59, wherein the selected channel is an analog input channel, wherein said executing includes returning data in units of the physical quantity being measured according to the channel configuration;

wherein said constructing the program does not require the user to create code to return data in the units of the physical quantity being measured.

63. The method of claim 59, wherein the selected channel is an analog output channel, wherein said executing includes generating data in units of the physical phenomenon of interest according to the channel configuration;

wherein said constructing the program does not require the user to create code to generate data in the units of the physical quantity being measured.

* * * * *

UNITED STATES PATENT AND TRADEMARK OFFICE
CERTIFICATE OF CORRECTION

PATENT NO. : 5,764,546

DATED : June 9, 1998

INVENTOR(S) : Deborah E. Bryant and Audrey f. Harvey

It is certified that error appears in the above-indentified patent and that said Letters Patent is hereby corrected as shown below:

```
Claim 48 col. 32, line 34, please delete the words "on the
displaying".
```

Signed and Sealed this

Eleventh Day of August 1998

Attest:

BRUCE LEHMAN

Attesting Officer       Commissioner of Patents and Trademarks